United States Patent
Nakahama et al.

(10) Patent No.: US 8,655,358 B2
(45) Date of Patent: Feb. 18, 2014

(54) WIRELESS COMMUNICATION SYSTEM, WIRELESS COMMUNICATION TERMINAL, AND SUBSCRIBER INFORMATION MANAGEMENT DEVICE

(75) Inventors: Koichi Nakahama, Fukuoka (JP); Tatsuya Tanoue, Kasuya (JP); Shinichi Kuranari, Fukuoka (JP); Atsushi Tsukazoe, Fukuoka (JP); Marie Kawano, Fukuoka (JP); Ryuichi Ebuchi, Fukuoka (JP); Mari Hamachi, Fukuoka (JP); Takeshi Yagyu, Sawara (JP); Keisuke Yoshino, Fukuoka (JP); Shuang Xu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 13/477,873

(22) Filed: May 22, 2012

(65) Prior Publication Data

US 2012/0315902 A1    Dec. 13, 2012

(30) Foreign Application Priority Data

Jun. 7, 2011    (JP) .................................. 2011-127594

(51) Int. Cl.
*H04W 4/00* (2009.01)

(52) U.S. Cl.
USPC ....... 455/435.1; 455/41.1; 455/420; 455/411; 455/456.2; 455/41.2; 370/338

(58) Field of Classification Search
USPC .......... 455/41.1, 410–414.4, 418–421, 575.2, 455/456.1–456.2, 435.1; 370/338
See application file for complete search history.

(56) References Cited

U.S. PATENT DOCUMENTS

| | | | |
|---|---|---|---|
| 6,424,820 B1 * | 7/2002 | Burdick et al. | 455/41.1 |
| 6,735,431 B1 * | 5/2004 | Tsunami et al. | 455/414.2 |
| 6,845,097 B2 * | 1/2005 | Haller et al. | 370/352 |
| 7,127,261 B2 * | 10/2006 | Van Erlach | 455/456.5 |
| 7,551,930 B2 * | 6/2009 | Lempio et al. | 455/456.3 |
| 7,603,145 B2 * | 10/2009 | Zinn et al. | 455/574 |
| 7,693,516 B2 * | 4/2010 | Hundal et al. | 455/435.1 |
| 7,953,400 B2 * | 5/2011 | Lee et al. | 455/418 |
| 8,213,908 B2 * | 7/2012 | Sangster et al. | 455/412.1 |
| 8,358,639 B2 * | 1/2013 | Black et al. | 370/338 |
| 8,457,617 B2 * | 6/2013 | Sweeney et al. | 455/418 |
| 8,498,618 B2 * | 7/2013 | Ben Ayed | 455/411 |
| 2005/0260996 A1 * | 11/2005 | Groenendaal | 455/445 |

FOREIGN PATENT DOCUMENTS

| | | | |
|---|---|---|---|
| JP | 2004-118742 A | | 4/2004 |
| JP | 2004-310624 A | | 11/2004 |
| JP | 2008-160509 A | | 7/2008 |
| JP | 2011-029920 A | | 2/2011 |
| WO | 2008/107984 A1 | | 9/2008 |

* cited by examiner

*Primary Examiner* — Sharad Rampuria
(74) *Attorney, Agent, or Firm* — Maschoff Brennan

(57) ABSTRACT

A wireless communication system includes: a first wireless communication terminal to register an external device, wherein a subscriber information management device transmits a location of the external device to the first wireless communication terminal based on a search result of the external device based on a search request for the external device, the search request being transmitted from the subscriber information management device to a second wireless communication terminal within a search target area, the second wireless communication terminal being identified by the subscriber information management device based on registration information including certain information and location information of the external device.

15 Claims, 33 Drawing Sheets

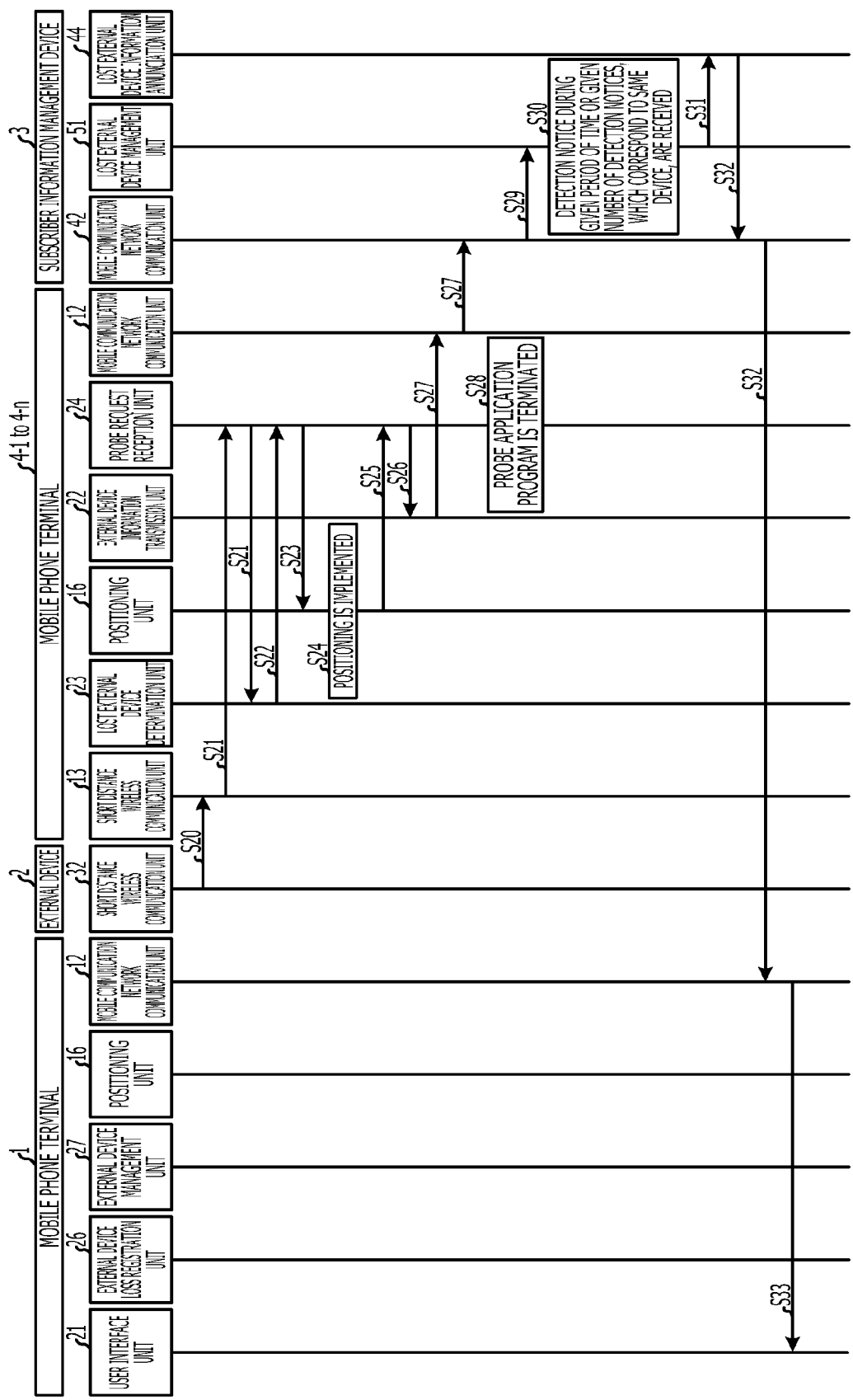

FIG. 7

| MANAGEMENT NUMBER | DEVICE NAME | CONNECTION METHOD | MAC ADDRESS | LOSS FLAG |
|---|---|---|---|---|
| #1 | EARPHONES | Bluetooth | xx-xx-xx-xx-xx | OFF |
| #2 | WRISTWATCH | Bluetooth | xx-xx-xx-xx-xx | OFF |
| #3 | PORTABLE GAME DEVICE | WIRELESS LAN | xx-xx-xx-xx-xx | OFF |
| #4 | HANDSFREE DEVICE | Bluetooth | xx-xx-xx-xx-xx | OFF |
| #5 | KEYBOARD | Bluetooth | xx-xx-xx-xx-xx | OFF |

FIG. 8

(BODY TEXT)
Subject : EXTERNAL DEVICE LOSS NOTICE

EARPHONES HAVE BEEN LOST, AND PLEASE SEARCH THOSE

----

(ATTACHED FILE)

SPECIFIC INFORMATION OF EARPHONES
INFORMATION OF LOCATION AT WHICH EARPHONES ARE ESTIMATED TO HAVE BEEN LOST (INFORMATION OF SELF-TERMINAL)
INFORMATION OF PERSON HAVING LOST EARPHONES (NAME AND PHONE NUMBER)

FIG. 9

| MANAGEMENT NUMBER | DEVICE NAME | PROBE REQUEST TIME | MAC ADDRESS | PROBE TARGET CELL |
|---|---|---|---|---|
| #1 | EARPHONES | 2011/01/XX XX:XX | xx-xx-xx-xx-xx-xx | xx-ku xx-chome |
| #2 | WRISTWATCH | 2011/01/XX XX:XX | xx-xx-xx-xx-xx-xx | xx-ku xx-chome |
| #3 | PORTABLE GAME DEVICE | 2011/01/XX XX:XX | xx-xx-xx-xx-xx-xx | xx-ku xx-chome |
| #4 | HANDSFREE DEVICE | 2011/01/XX XX:XX | xx-xx-xx-xx-xx-xx | xx-ku xx-chome |
| #5 | KEYBOARD | 2011/01/XX XX:XX | xx-xx-xx-xx-xx-xx | xx-ku xx-chome |

FIG. 10

(BODY TEXT)
Subject :SEARCH REQUEST (MANAGEMENT NUMBER: #1)

PLEASE SEARCH "EARPHONES" THAT HAVE BEEN LOST AROUND HERE

---

(ATTACHED FILE)

PROBE APPLICATION PROGRAM
SPECIFIC INFORMATION OF EARPHONES

FIG. 11

```
(BODY TEXT)
Subject :DETECTION NOTICE (MANAGEMENT NUMBER: #1)

"EARPHONES" HAVE BEEN DETECTED
-------------------------------------------------------------
(ATTACHED FILE)

SPECIFIC INFORMATION OF EARPHONES
PHONE NUMBER OF SELF-TERMINAL
LOCATION INFORMATION OF SELF-TERMINAL
```

FIG. 13

Subject :DISCOVERY NOTICE (MANAGEMENT NUMBER: #1)

"EARPHONES" HAVE BEEN DISCOVERED

DISPLAY MAP OF DISCOVERY LOCATION

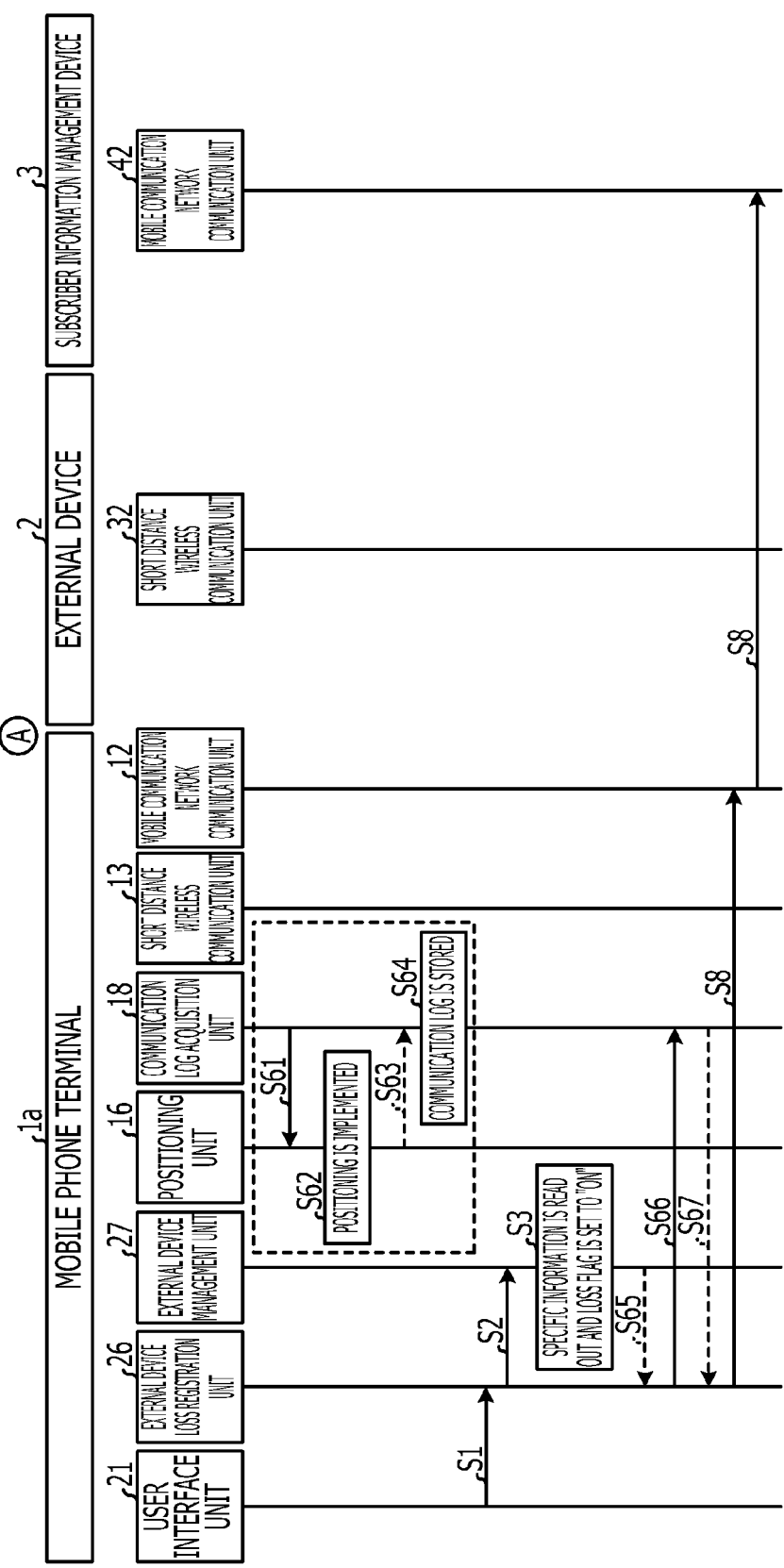

FIG. 20

| TIME | LOG TYPE | DEVICE INFORMATION | LOCATION INFORMATION | | |
|---|---|---|---|---|---|
| | | | LATITUDE | LONGITUDE | CELL INFORMATION |
| 2010-01-10 xx:xx:xx | COMMUNICATION START | xx-xx-xx-xx-xx-xx | 33 DEGREES 35 MINUTES 33.572 SECONDS | 130 DEGREES 21 MINUTES 17.798 SECONDS | CELL #1 |
| 2010-01-10 xx:xx:xx | COMMUNICATION END | xx-xx-xx-xx-xx-xx | 33 DEGREES 35 MINUTES 38.155 SECONDS | 130 DEGREES 21 MINUTES 14.609 SECONDS | CELL #2 |
| 2010-01-10 xx:xx:xx | HANDOVER | | 33 DEGREES 35 MINUTES 38.155 SECONDS | 130 DEGREES 21 MINUTES 14.609 SECONDS | CELL #3 |

FIG. 25

```
(BODY TEXT)
Subject :LOSS DEREGISTRATION NOTICE (MANAGEMENT
NUMBER: #1)

SINCE EXTERNAL DEVICE HAS BEEN DETECTED USING SHORT
DISTANCE WIRELESS COMMUNICATION, PLEASE CANCEL
LOSS REGISTRATION
```

FIG. 26

(BODY TEXT)
Subject :PROBE REQUEST CANCELLATION NOTICE (MANAGEMENT NUMBER: #1)

SINCE EXTERNAL DEVICE HAS BEEN DISCOVERED, PROBE IS TO BE TERMINATED
THANK YOU FOR YOUR COOPERATION

FIG. 30

(BODY TEXT)
Subject :EXTERNAL DEVICE CONNECTION NOTICE

SINCE CONNECTION TO EXTERNAL DEVICE HAS BEEN
ESTABLISHED, PLEASE PERFORM CHECKING

---

(ATTACHED FILE)

MAC ADDRESS OF EARPHONES
PHONE NUMBER OF SELF-TERMINAL

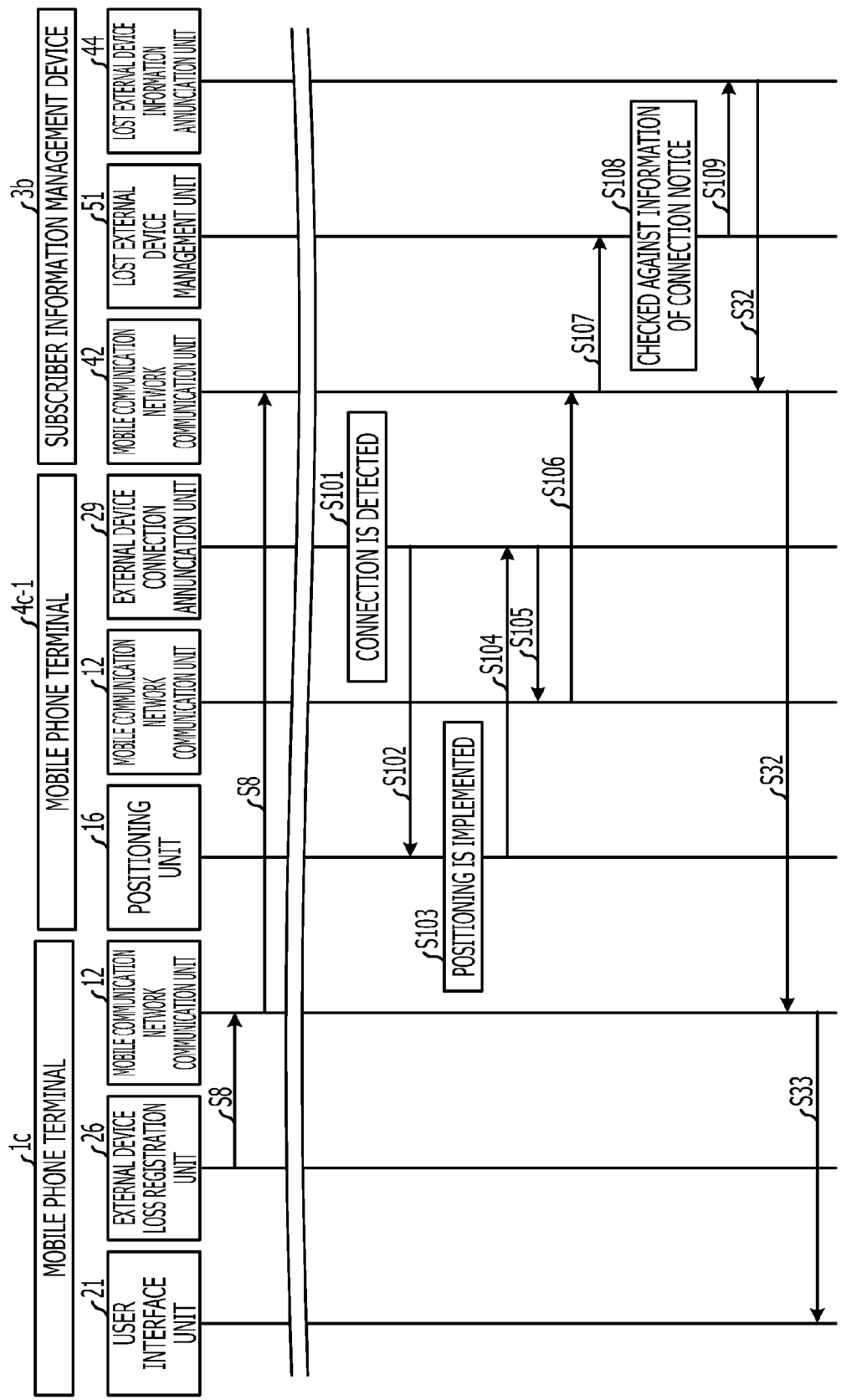

WIRELESS COMMUNICATION SYSTEM, WIRELESS COMMUNICATION TERMINAL, AND SUBSCRIBER INFORMATION MANAGEMENT DEVICE

CROSS-REFERENCE TO RELATED APPLICATION(S)

This application is based upon and claims the benefit of priority of the prior Japanese Patent Application No. 2011-127594, filed on Jun. 7, 2011, the entire contents of which are incorporated herein by reference.

FIELD

The embodiments discussed herein are related to a wireless communication system.

BACKGROUND

In the wireless communication system, a missing wireless device is searched.

A technique of the related art is disclosed in Japanese Laid-open Patent Publication No. 2008-160509, Japanese Laid-open Patent Publication No. 2011-29920, or the like.

SUMMARY

According to an aspect of the embodiments, a wireless communication system includes: a first wireless communication terminal to register an external device, wherein a subscriber information management device transmits a location of the external device to the first wireless communication terminal based on a search result of the external device based on a search request for the external device, the search request being transmitted from the subscriber information management device to a second wireless communication terminal within a search target area, the second wireless communication terminal being identified by the subscriber information management device based on registration information including certain information and location information of the external device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A and FIG. 6B illustrate an exemplary operation of a wireless communication system;
FIG. 7 illustrates an exemplary external device management table;
FIG. 8 illustrates an exemplary external device loss notice;
FIG. 9 illustrates an exemplary search request management table;
FIG. 10 illustrates an exemplary search request;
FIG. 11 illustrates an exemplary detection notice;
FIG. 13 illustrates an exemplary discovery notice;
FIG. 20 illustrates an exemplary communication log;
FIG. 25 illustrates an exemplary loss deregistration notice;
FIG. 26 illustrates an exemplary search request cancellation notice;
FIG. 30 illustrates an exemplary external device connection notice;
and
FIG. 31 illustrates an exemplary operation of a wireless communication system.

DESCRIPTION OF EMBODIMENTS

When short distance wireless communication between a main phone attached to a mobile phone and a cordless handset attached to a valuable has been disconnected, the mobile phone detects misplacement and notifies the holder of the mobile phone and a monitor server of the misplacement. Using a mail, the monitor server notifies a mobile phone, which belongs to an involved person nearest to a misplacement location, of the information of the misplacement based on a contact list.

When a second terminal unit, which establishes communication with a first terminal unit connectable to a mobile communication network using short distance wireless communication, has been misplaced, the second terminal unit notifies a management server of the occurrence of the misplacement, location information, or the like through another mobile phone. Using a mail, a phone, or the like, the management server notifies the first terminal unit of the occurrence of the misplacement, the location information of the second terminal unit or the like.

Figure 1:
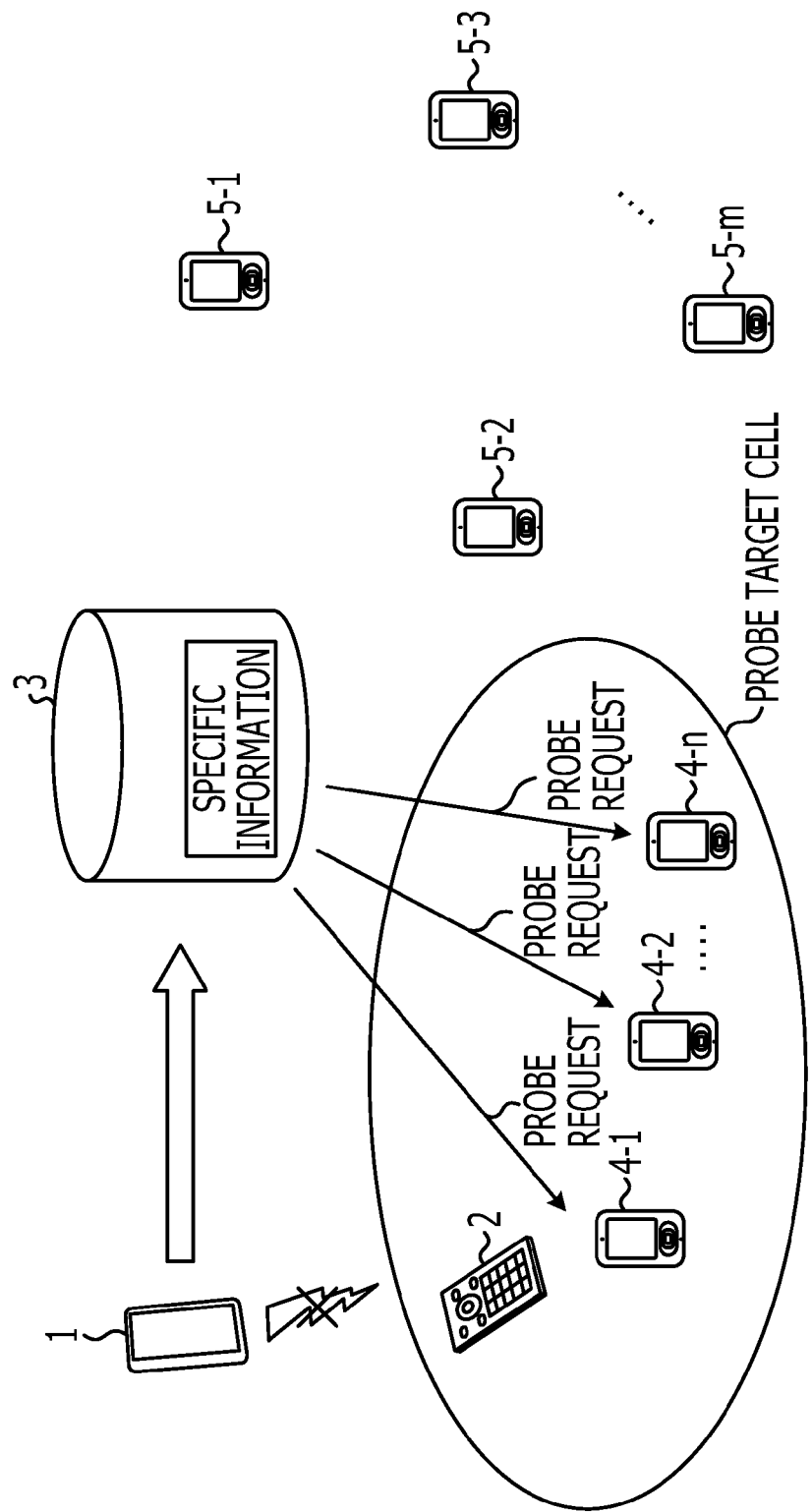
FIG. 1 illustrates an exemplary wireless communication system.

FIG. 1 illustrates an exemplary wireless communication system. The wireless communication system includes mobile phone terminals 1, 4-1 to 4-*n*, and 5-1 to 5-*m*, which correspond to communication terminals, and an external device 2 corresponding to a wireless device connectable to the mobile phone terminal 1 using the short distance wireless communication, and a subscriber information management device 3. For example, when a user to which the mobile phone terminal 1 belongs has lost the external device 2, the mobile phone terminal 1 notifies the subscriber information management device 3 of the loss of the external device 2 in accordance with a user operation. Using the mobile communication network, the mobile phone terminal 1 notifies the subscriber information management device 3 of the loss of the external device 2 along with the specific information of the external device 2 and the current location information of the self-terminal. The subscriber information management device 3 estimates the loss location of the external device 2 based on the location information of the mobile phone terminal 1, and transmits a search request including the specific information of the external device 2 to the mobile phone terminals 4-1 to 4-n existing in the neighborhood of the loss location, for example, in a search target cell illustrated in FIG. 1. The mobile phone terminals 4-1 to 4-n having received the search request search the external device 2 using the short distance wireless communication. As a result of the search, each mobile phone terminal having detected the lost external device 2 notifies the subscriber information management device 3 of the location information of the self-station. The subscriber information management device 3 identifies the location of the external device 2 based on the location information from each mobile phone terminal having detected the external device 2, and notifies the mobile phone terminal 1 of the location of the external device 2.

Figure 2:
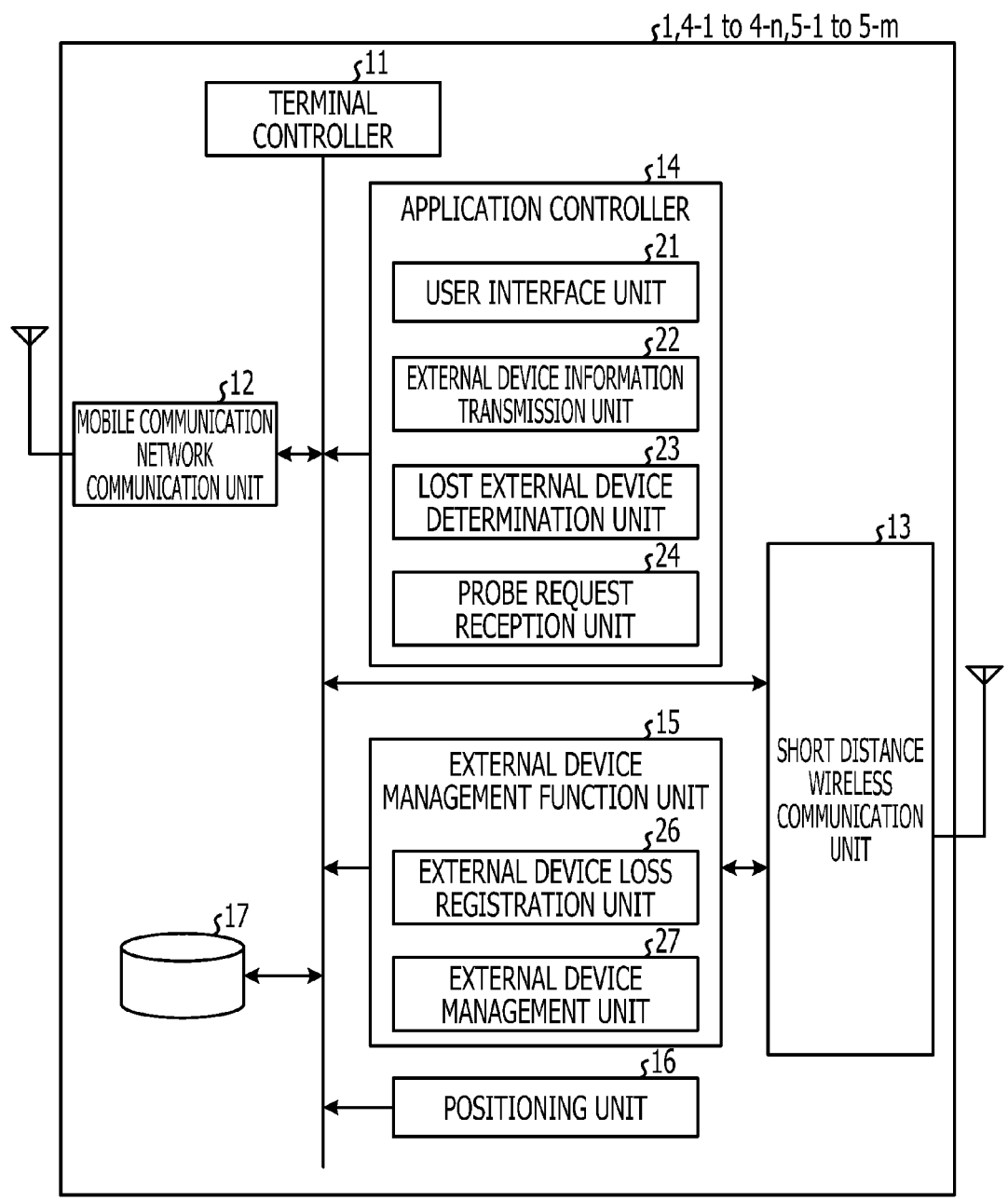
FIG. 2 illustrates an exemplary mobile phone terminal.

FIG. 2 illustrates an exemplary mobile phone terminal. The mobile phone terminal illustrated in FIG. 2 may be each of the mobile phone terminals 1, 4-1 to 4-n, and 5-1 to 5-m illustrated in FIG. 1. The mobile phone terminal illustrated in FIG. 2 includes a terminal controller 11, a mobile communication network communication unit 12, a short distance wireless communication unit 13, an application controller 14, an external device management function unit 15, a positioning unit 16, and a storage unit 17. The application controller 14 includes a user interface unit 21, an external device information transmission unit 22, a lost external device determination unit 23, and a search request reception unit 24. The external device management function unit 15 includes an external device loss registration unit 26 and an external device management unit 27. Each functional unit of the mobile phone terminal may include a central processing unit (CPU), a Field Programmable Gate Array (FPGA), a memory, or the like.

The terminal controller 11 illustrated in FIG. 2 controls the whole mobile phone terminal. The mobile communication network communication unit 12 couples to a predetermined mobile communication network, and performs the transmission and reception of a wireless signal. The mobile communication network includes Third Generation Partnership Project (3GPP), Long Term Evolution (LTE), Global System for Mobile Communications (GSM), Worldwide Interoperability for Microwave Access (WiMAX) or the like. The short distance wireless communication unit 13 performs short distance wireless communication based on Bluetooth (registered trademark), wireless fidelity (Wi-Fi), IC communication, a wireless LAN, or the like.

The user interface unit 21 illustrated in the application controller 14 may be an interface for a user operation, screen display, or the like. When an external device of a search request target has been detected, the external device information transmission unit 22 notifies the subscriber information management device 3 of a detection notice. The lost external device determination unit 23 determinates whether a wireless device, which is detected using the short distance wireless communication, is the external device of a search request target. When having received a search request from the subscriber information management device 3, the search request reception unit 24 requests the short distance wireless communication unit 13 to search the external device using the short distance wireless communication.

The external device loss registration unit 26 illustrated in the external device management function unit 15 transmits, to the subscriber information management device 3, an external device loss notice including the specific information of the lost external device 2, the location information of the self-terminal, and the like. The external device management unit 27 searches pieces of specific information of all external devices 2 managed in the self-terminal based on an external device management table.

Using the information of Global Positioning System (GPS), the information of a radio wave intensity with respect to a base station, or the like, the positioning unit 16 identifies the location of the self-terminal. The storage unit 17 includes a memory or the like, and stores therein an external device management table in which the specific information of the external device 2 managed by the self-terminal is described, processing result information, or the like.

The mobile phone terminal may also include a function other than the functions described above.

Figure 3:
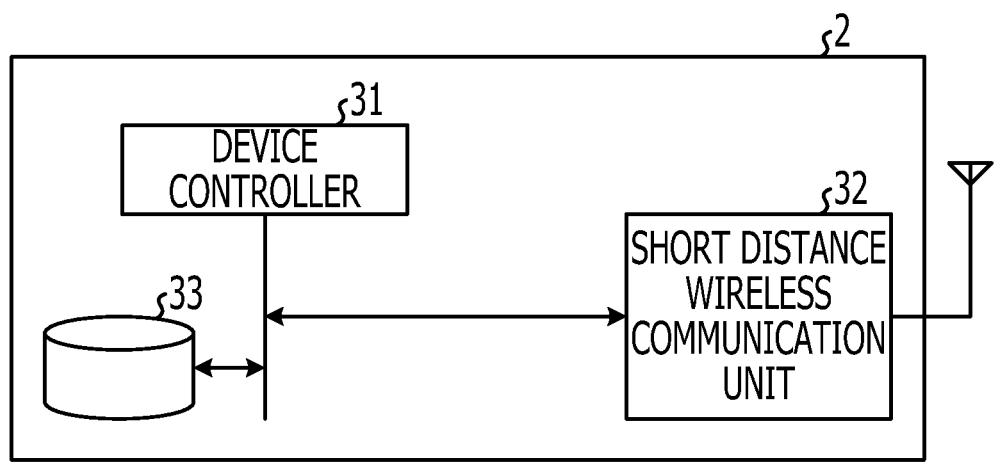
FIG. 3 includes an exemplary external device.

FIG. 3 includes an exemplary external device. The external device illustrated in FIG. 3 may be the external device 2 illustrated in FIG. 1. The external device 2 illustrated in FIG. 3 includes a device controller 31, a short distance wireless communication unit 32, and a storage unit 33. Each functional unit of the external device 2 may include a CPU, an FPGA, a memory, or the like, for example.

The device controller 31 illustrated in FIG. 3 controls the whole external device 2. The short distance wireless communication unit 32 performs short distance wireless communication based on Bluetooth, Wi-Fi, IC communication, a wireless LAN, or the like. The storage unit 33 includes a memory or the like, and stores therein processing result information, or the like. The external device 2 may also include a function other than the functions described above.

Figure 4:
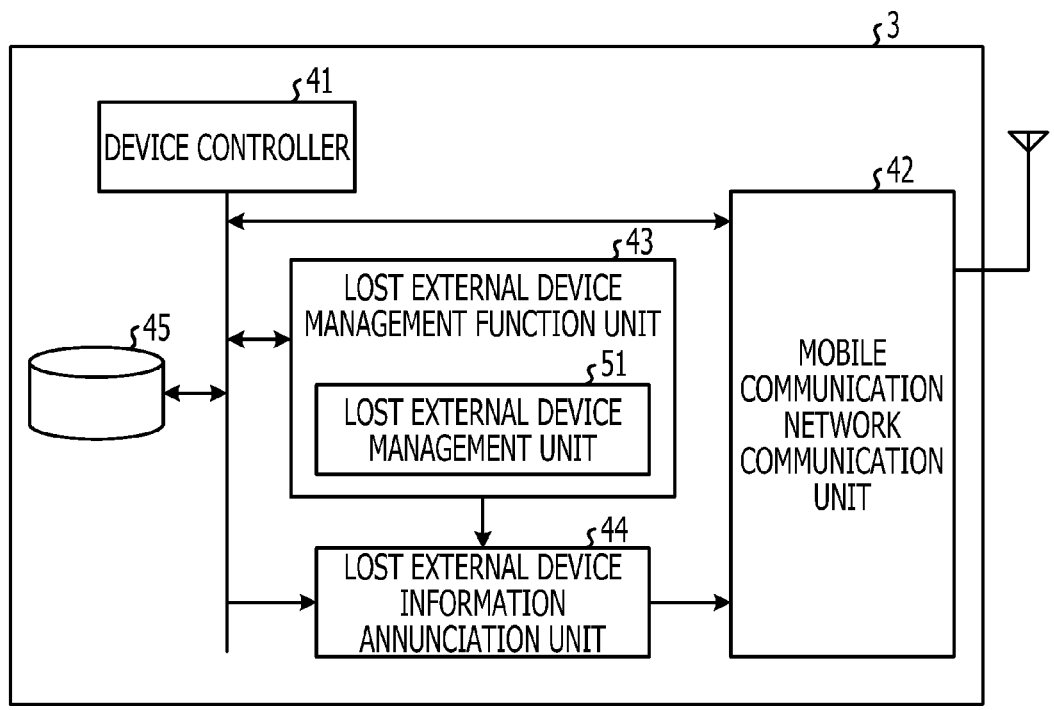
FIG. 4 illustrates an exemplary subscriber information management device.

FIG. 4 illustrates an exemplary subscriber information management device. The subscriber information management device illustrated in FIG. 4 may be the subscriber information management device illustrated in FIG. 1. The subscriber information management device 3 illustrated in FIG. 4 includes a device controller 41, a mobile communication network communication unit 42, a lost external device management function unit 43, a lost external device information annunciation unit 44, and a storage unit 45. The lost external device management function unit 43 includes a lost external device management unit 51. Each functional unit of the subscriber information management device 3 may include a CPU, an FPGA, a memory, or the like, for example.

The device controller 41 illustrated in FIG. 4 controls the whole subscriber information management device 3. The mobile communication network communication unit 42 couples to the mobile communication network, and performs the transmission and reception of a wireless signal. The lost external device management unit 51 in the lost external device management function unit 43 registers and manages the specific information or the like of the external device 2 lost by the mobile phone terminal 1, in the storage unit 45. The lost external device management unit 51 identifies the location of the lost external device 2 based on the location information of all mobile phone terminals having detected the lost external device 2. The lost external device information annunciation unit 44 transmits a request for probing the external device 2 to mobile phone terminals within a search target cell. The lost external device information annunciation unit 44 transmits, to the mobile phone terminal 1, a discovery notice including the location information of the lost external device 2. The storage unit 45 includes a memory or the like, and stores therein the specific information (loss registration information) of the external device 2 lost by the mobile phone terminal 1, a search request management table in which information relating to a search request is described, processing result information, or the like.

The subscriber information management device 3 may also include a function other than the functions described above.

Figure 5:
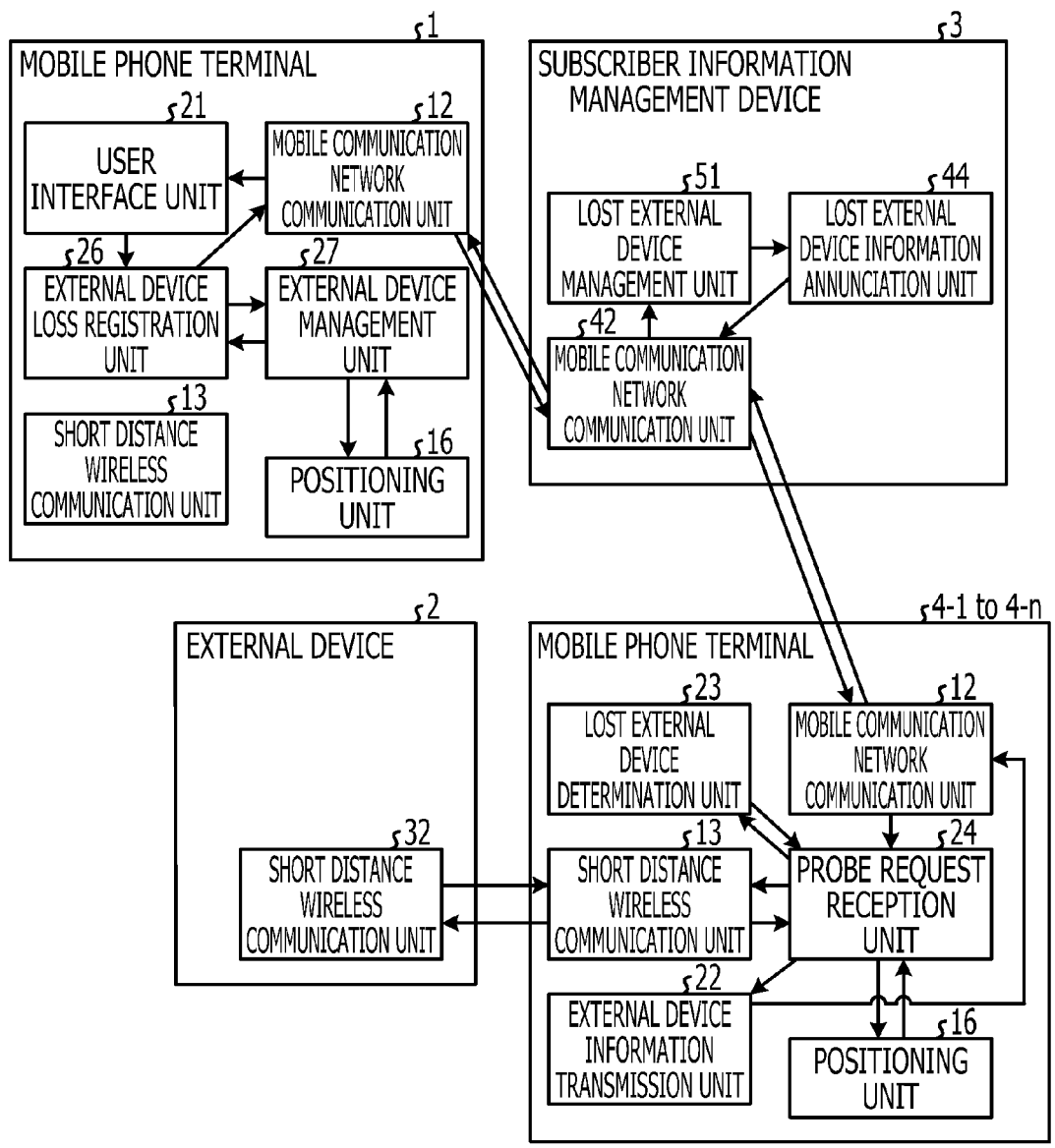
FIG. 5 illustrates an exemplary wireless communication system.
Figure 6A:
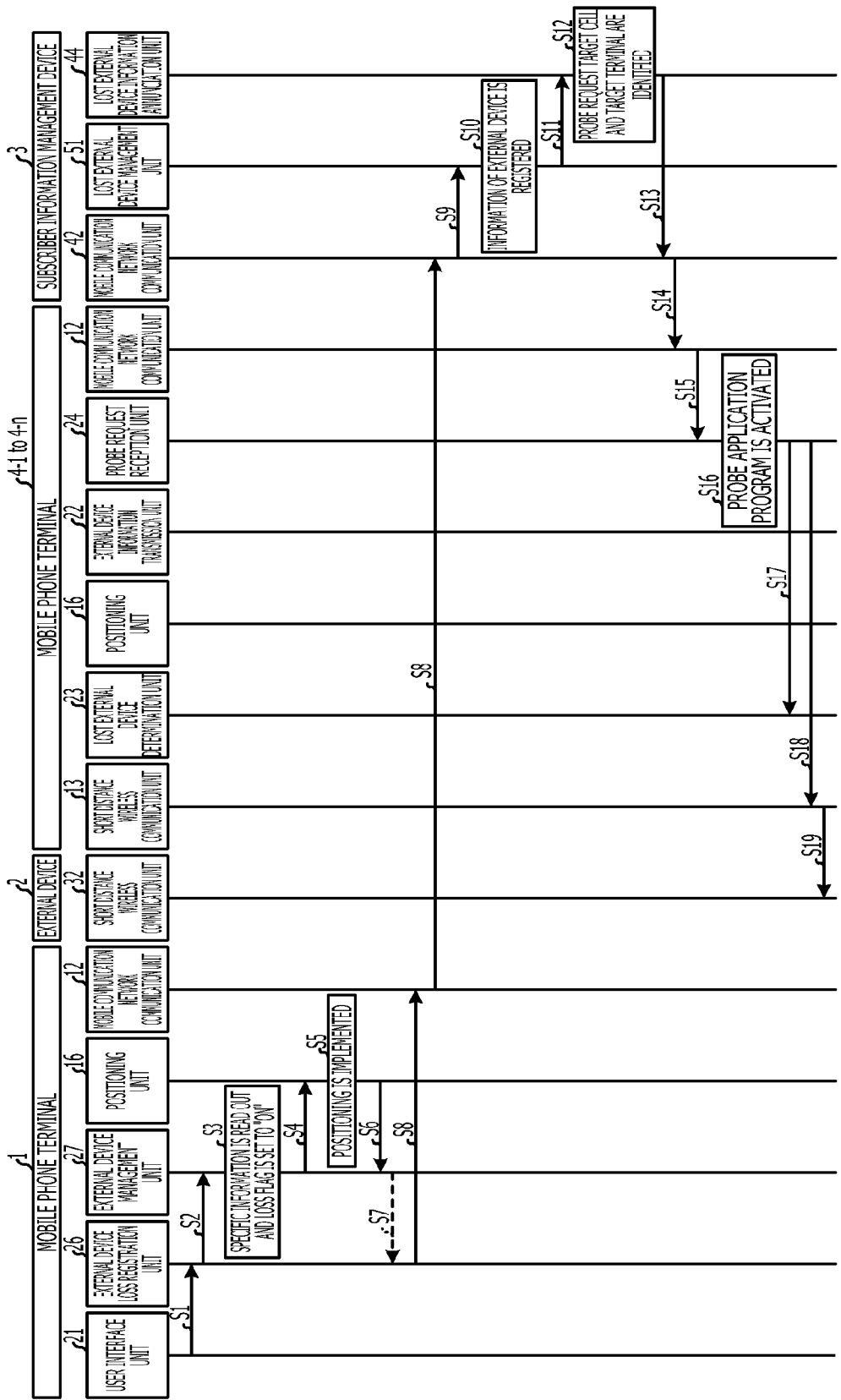

FIG. 5 illustrates an exemplary wireless communication system. FIG. 6A and FIG. 6B illustrate an exemplary operation of a wireless communication system. The wireless communication system illustrated in FIG. 5 may execute the operation illustrated in FIG. 6A and FIG. 6B. For example, earphones corresponding to the external device 2 may be lost. The loss may be loss or the like due to misplacement or a theft, for example, and includes a situation in which it may be hard for the short distance wireless communication unit 13 in the mobile phone terminal 1 to communicate with the short distance wireless communication unit 32 in the external device 2. Bluetooth may be used as the short distance wireless communication.

For example, when the holder of the mobile phone terminal 1 has lost the earphones corresponding to the external device 2, the holder operates the user interface unit 21 to register the loss of the earphones in the subscriber information management device 3. For example, the external device loss registration unit 26 which has received a registration request from the user interface unit 21 requests information relating to the earphones to the external device management unit 27 (S1 and S2). The external device management unit 27 searches within the external device management table stored in the storage unit 17, and reads the network identification information or the like of the earphones.

FIG. 7 illustrates an exemplary external device management table. In the external device management table illustrated in FIG. 7, a management number, a device name, a connection method, or a MAC address may be stored as the specific information, in units of external devices managed by the mobile phone terminal 1. For example, the earphones may correspond to a management number #1, a wristwatch may correspond to a management number #2, a portable game device may correspond to a management number #3, a handsfree device may correspond to a management number #4, and a keyboard may correspond to a management number #5. As the network identification information, a method (Bluetooth, a wireless LAN, or the like) for coupling to the external device or the MAC address of the external device is stored. For example, when Bluetooth or a wireless LAN is used as the short distance wireless communication, a MAC address assigned to the external device is used as the network identification information. The external device management table includes a loss flag indicating whether or not the external device is lost (ON (a case of being lost) or OFF (a case of not being lost)).

For example, the external device management unit 27 searches within the external device management table, reads the specific information of the lost earphones (S3), and sets the loss flag to ON (an initial value: OFF) (S3). The external device management unit 27 notifies the positioning unit 16 of a location information acquisition request (S4). The positioning unit 16 measures the current location information of the self-terminal (S5), and notifies the external device management unit 27 of a measurement result (S6).

The external device management unit 27 notifies the external device loss registration unit 26 of the specific information of the lost earphones and the location information of the self-terminal (S7). Through the mobile communication network communication unit 12 and the mobile communication network, the external device loss registration unit 26 transmits, to the subscriber information management device 3, an external device loss notice including the specific information of the lost earphones, the location information of the self-terminal, the information of a person having lost the earphones (a name, a phone number, and the like), and the like (S8). For example, the external device loss notice is transmitted using an electronic mail. FIG. 8 illustrates an exemplary external device loss notice. The external device loss notice includes a body text in which a certain message is described and an attached file. The mobile communication network is used for transmission from the mobile phone terminal 1 to the subscriber information management device 3. When the mobile phone terminal 1 and the subscriber information management device 3 are coupled to each other using a wired network, a wired network may be used between devices.

The mobile communication network communication unit 42 in the subscriber information management device 3, which has received the external device loss notice, transfers the attached file included in the external device loss notice to the lost external device management unit 51 (S9). The lost external device management unit 51 registers the specific information of the lost earphones, the location information of the mobile phone terminal 1, and the information of a person having lost the earphones, which correspond to the attached file, in the storage unit 45 as the loss registration information (S10). The lost external device management unit 51 notifies the lost external device information annunciation unit 44 of the loss registration information (S11).

Based on the location information of the mobile phone terminal 1, the lost external device information annunciation unit 44 identifies a search target cell that is a target cell in which the earphones are to be searched, and identifies a mobile phone terminal within the cell (S12). For example, the mobile phone terminals 4-1 to 4-*n* within the search target cell illustrated in FIG. 1 may be identified. When the mobile phone terminal 1 is located at the boundary between a plurality of cells, all adjacent cells may be set as search target cells.

The lost external device information annunciation unit 44 notifies the mobile communication network communication unit 42 of a search request including the specific information of the earphones (S13). The lost external device information annunciation unit 44 stores information relating to the search request in the search request management table within the storage unit 45. FIG. 9 illustrates an exemplary search request management table. In the search request management table illustrated in FIG. 9, a management number, a search request time, a MAC address, or a search target cell is stored in units of external devices for which search requests have been made. For example, the earphones may correspond to a management number #1, a wristwatch may correspond to a management number #2, a portable game device may correspond to a management number #3, a handsfree device may correspond to a management number #4, and a keyboard may correspond to a management number #5.

In the mobile communication network communication unit 42 which has received the search request, cell broadcast is executed with being targeted at the identified cell, and the mobile phone terminals 4-1 to 4-*n* are notified of the received search request (S14). For example, the search request may be concurrently transmitted using an electronic mail. FIG. 10 illustrates an exemplary search request. The search request includes a body text in which a certain message is described and an attached file. While, in FIG. 10, a search application program is attached, the download address of the program may also be attached. When the lost earphones have not been found during a certain period of time, the subscriber information management device 3 may also make a search request to another cell. The cell may also correspond to an area covered by one base station.

The mobile communication network communication unit 12 in each mobile phone terminal which has received the search request from the subscriber information management device 3 transfers the attached file of the search request to the search request reception unit 24 in each self-terminal (S15). Each search request reception unit 24 activates the search application program (S16), and notifies the lost external device determination unit 23 of the specific information of the earphones included in the attached file (S17). The lost external device determination unit 23 registers the received specific information of the earphones in the storage unit 17. The search request reception unit 24 requests the short distance wireless communication unit 13 to search the lost earphones (S18). In the mobile phone terminal, the search may be performed using Bluetooth, a wireless LAN, or the like. For example, when a connection method for the earphones is Bluetooth, the earphones may be searched using Bluetooth as illustrated in FIG. 7.

The short distance wireless communication unit 13 searches a neighboring wireless device using the function of Bluetooth (S19), and waits for a response. When the response occurs from the neighboring wireless device (S20), the short distance wireless communication unit 13 notifies the lost external device determination unit 23 of the information of the detected wireless device through the search request reception unit 24 (S21). The lost external device determination unit 23 determines whether the detected wireless device matches the specific information of the earphones, stored in the storage unit 17, and notifies the search request reception unit 24 of a result (S22).

When the determination of the lost external device determination unit 23 corresponds to match, the search request reception unit 24 notifies the positioning unit 16 of a location information acquisition request (S23). The positioning unit 16 measures the current location information of the self-terminal (S24), and notifies the search request reception unit 24 of a measurement result (S25). The search request reception unit 24 notifies the external device information transmission unit 22 of the specific information of the earphones and the location information of the self-terminal (S26).

The external device information transmission unit 22 transmits, to the subscriber information management device 3, a detection notice including the specific information of the earphones, the location information of the self-terminal, the phone number of the self-terminal, and the like through the mobile communication network communication unit 12 (S27). For example, the detection notice is transmitted using an electronic mail. FIG. 11 illustrates an exemplary detection notice. The detection notice includes a body text in which a certain message is described and an attached file. The search request reception unit 24 terminates the search application program at an arbitrary timing after the detection notice has been transmitted (S28).

The mobile communication network communication unit 42 in the subscriber information management device 3, which has received the detection notice, notifies the lost external device management unit 51 of the attached file of the detection notice (S29). The lost external device management unit 51 waits for the reception of a detection notice during a given period of time or a given number of detection notices, which correspond to the lost earphones, and identifies the location of the lost earphones based on the location information of all mobile phone terminals which have detected the earphones (S30).

Figure 12:
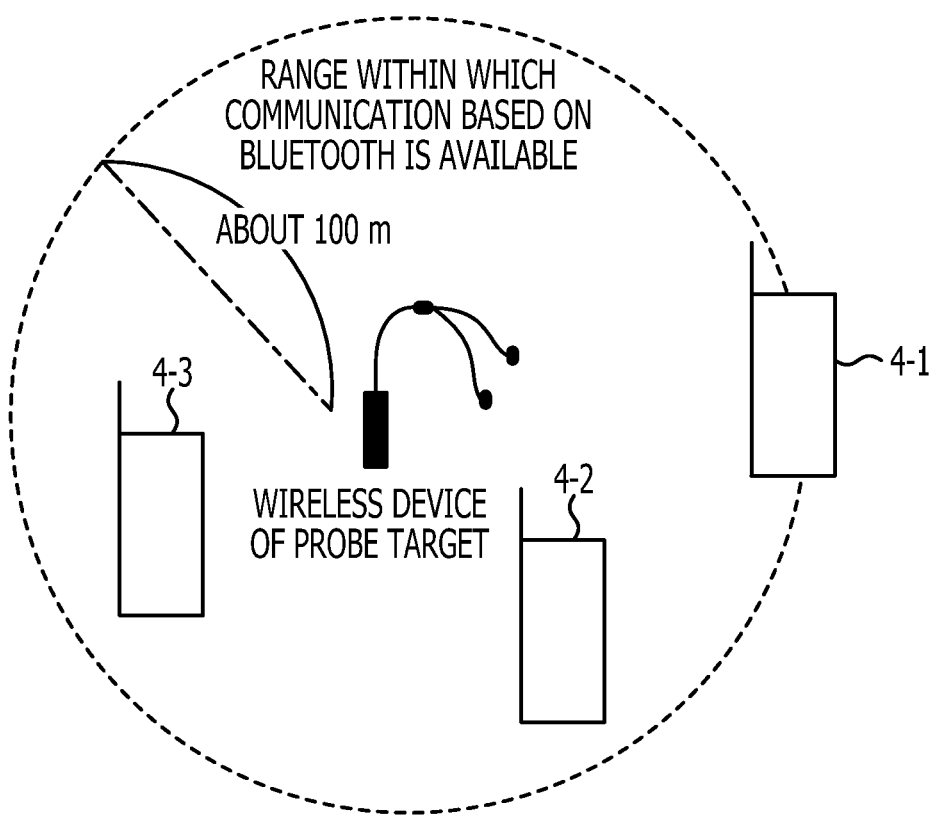
FIG. 12 illustrates an exemplary location identification method.

FIG. 12 illustrates an exemplary location identification method. For example, the location of the lost earphones may be identified. When the mobile phone terminal searches a neighboring wireless device using Bluetooth, the radio wave of the mobile phone terminal may reach up to about 100 m. For example, the lost external device management unit 51 identifies, as the location of the earphones, a location in which the communication ranges of the individual mobile phone terminals 4-1, 4-2, and 4-3 having detected the earphones overlap with one another, the communication ranges being based on Bluetooth.

The lost external device management unit 51 notifies the lost external device information annunciation unit 44 of the location of the earphones (S31). The lost external device information annunciation unit 44 transmits, to the mobile phone terminal 1, a discovery notice including the location information of the earphones through the mobile communication network communication unit 42 and the mobile communication network (S32). For example, the discovery notice is transmitted using an electronic mail. FIG. 13 illustrates an exemplary discovery notice. In the discovery notice, the map of the discovery location of the earphones is described in a body text.

The mobile communication network communication unit 12 in the mobile phone terminal 1 which has received the discovery notice notifies the user interface unit 21 of the content of the discovery notice (S33). The user interface unit 21 displays, on the display screen of the mobile phone terminal 1, a screen (map display) indicating the discovery of the earphones.

When the holder of the mobile phone terminal 1 has lost the external device 2, the mobile phone terminals (4-1 to 4-*n*) around the mobile phone terminal 1 may search the external device 2 using the short distance wireless communication. Without using an independent communication protocol, the mobile phone terminals 4-1 to 4-*n* may search the external device 2 using an existing short distance wireless communication function. Without using the independent communication protocol, the lost external device 2 may be easily discovered using an existing communication protocol.

As an example of the short distance wireless communication, Bluetooth may be used, and alternatively, a wireless LAN may also be used. For example, when the mobile phone terminal and a wireless device registered as the external device communicate with each other using the wireless LAN, a search-dedicated Service Set Identifier (SSID) at the time of loss may be preliminarily assigned to the mobile phone terminal and the wireless device. For example, a search-dedicated SSID at the time of loss may be assigned to each external device by a developer, and may be managed by both of the external device and the mobile phone terminal. For example, the SSID may be a character string including the MAC address of the external device.

When the registration and the search of the external device 2 utilizing the wireless LAN are performed, the search-dedicated SSID may be included in an external device loss notice or a search request. For example, the mobile phone terminals 4-1 to 4-*n*, which has received a search request from the subscriber information management device 3, search the external device using the SSID given notice of (S19). For example, a "Search request" is transmitted. The external device 2 which has received the "Search request" based on the search-dedicated SSID sends back a "Search response" as a response (S20). By receiving the "Search response", the mobile phone terminals 4-1 to 4-*n* determine whether or not the external device of a search target has been detected, and when the external device of a search target has been detected, the mobile phone terminals 4-1 to 4-*n* transmit detection notices to the subscriber information management device 3.

Figure 14:
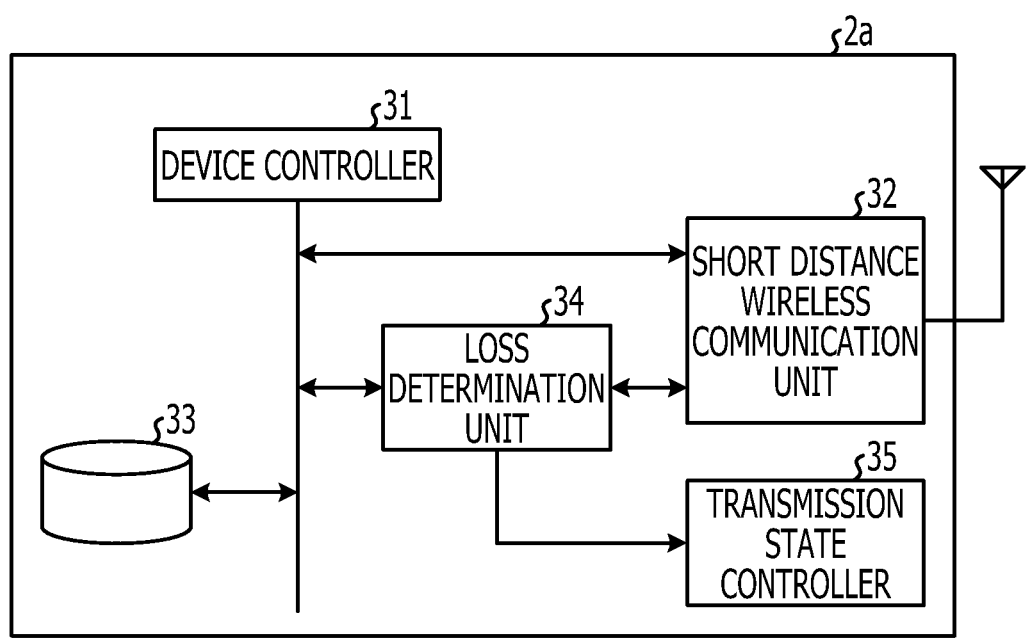
FIG. 14 illustrates an exemplary external device.

FIG. 14 illustrates an exemplary external device. An external device 2*a* illustrated in FIG. 14 may be the external device 2 illustrated in FIG. 1. The external device 2*a* includes a device controller 31, a short distance wireless communication unit 32, a storage unit 33, a loss determination unit 34, and a transmission state controller 35. In FIG. 14, a same symbol is assigned to an element that is substantially the same as or similar to the element illustrated in FIG. 3, and the description thereof may be omitted or reduced. Each functional unit in the external device 2*a* may include a CPU, an FPGA, a memory, or the like, for example.

The storage unit 33 includes a memory and the like, and stores therein the MAC address of the mobile phone terminal 1 of the holder, information obtained in the process, and the like. The loss determination unit 34 determines whether the mobile phone terminal 1 has lost the external device 2*a*. When the external device 2*a* is in a loss state, the transmission state controller 35 causes the regular transmission of a wireless signal of the short distance wireless communication unit 32 to be halted. For example, the short distance wireless communication unit 32 may not perform transmission other than at the time of a response corresponding to search.

Figure 15:
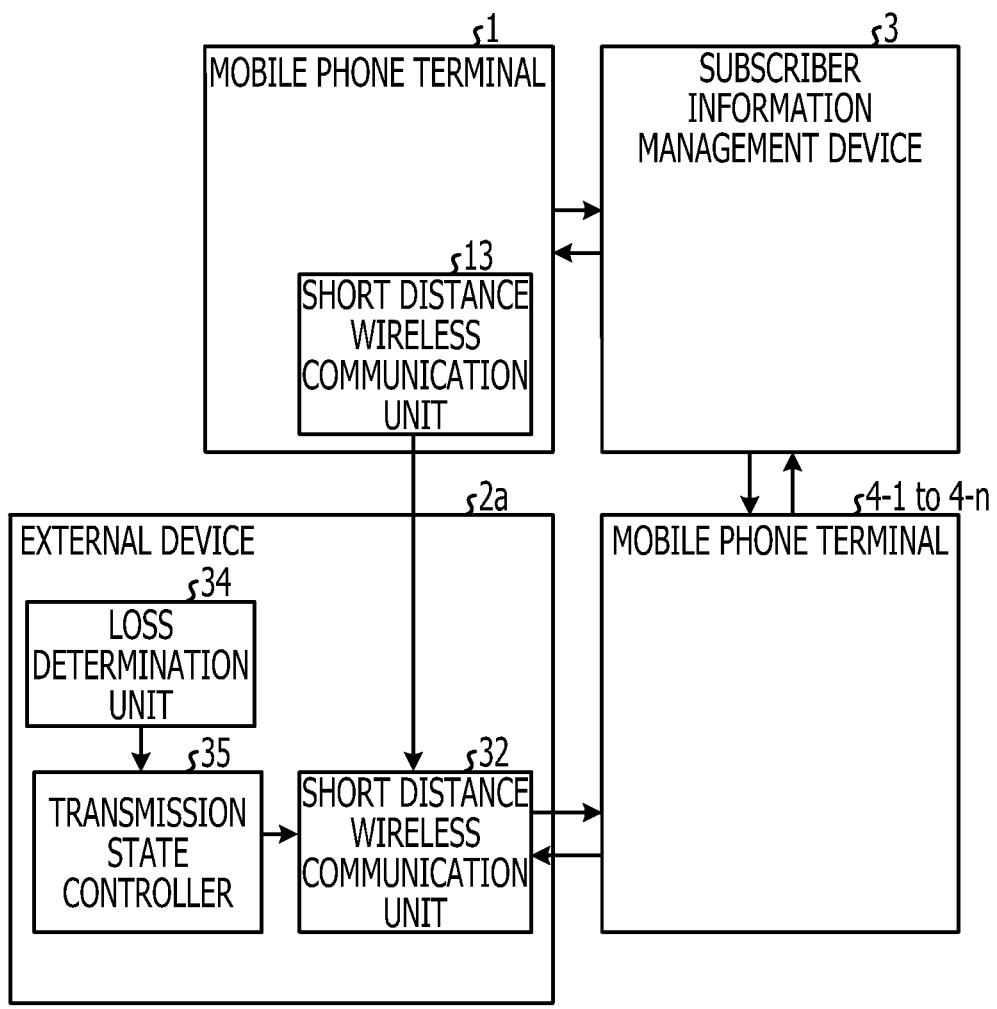
FIG. 15 illustrates an exemplary wireless communication system.
Figure 16:
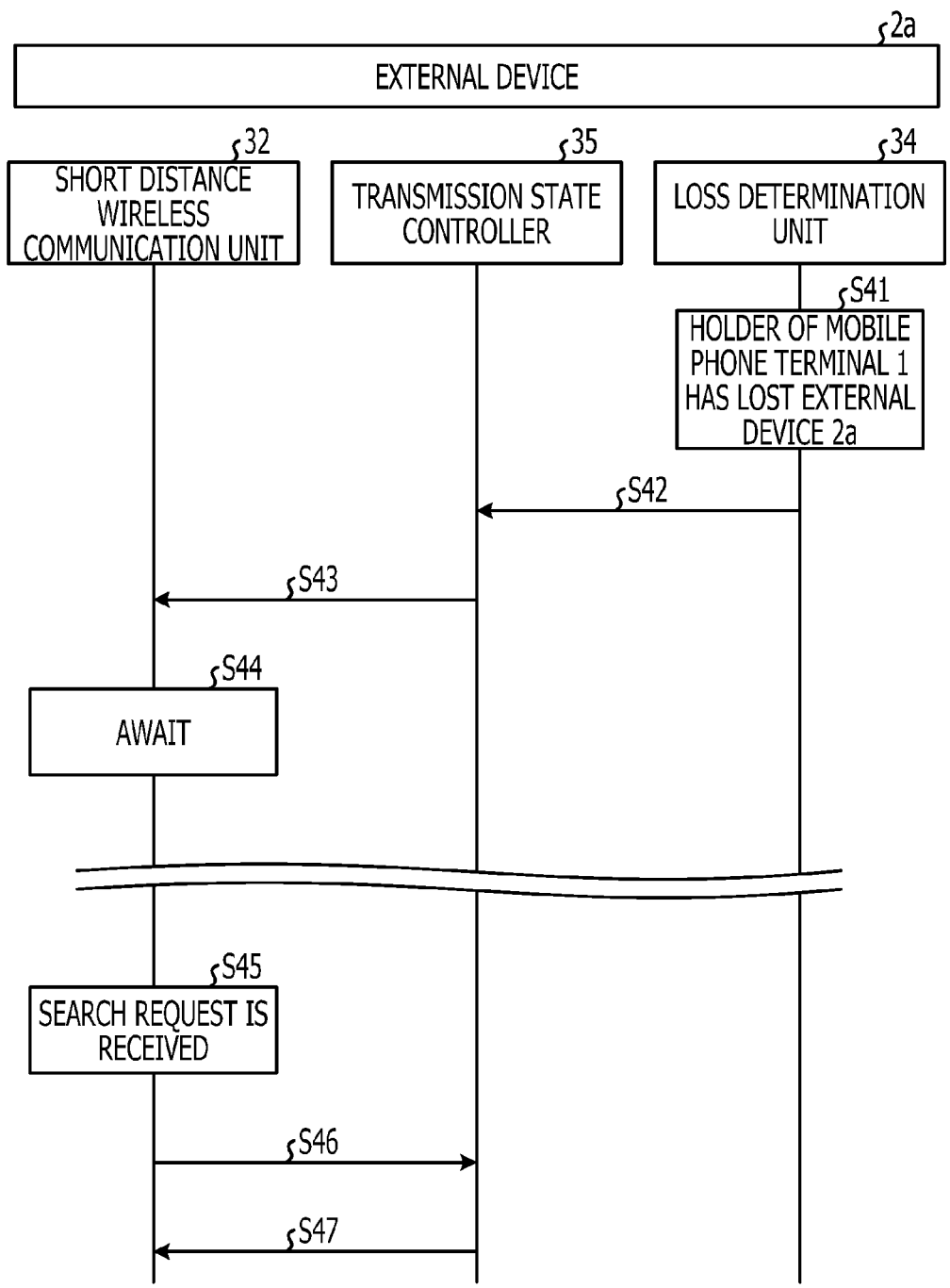
FIG. 16 illustrates an exemplary operation of a wireless communication system.

FIG. 15 illustrates an exemplary wireless communication system. The wireless communication system illustrated in FIG. 15 may include the external device 2*a*. Other elements illustrated in FIG. 15 may be substantially the same as or similar to the elements illustrated in FIG. 5. FIG. 16 illustrates an exemplary operation of the wireless communication system. The wireless communication system illustrated in FIG. 15 may execute the operation illustrated in FIG. 16.

For example, the loss determination unit 34 autonomously determines whether the earphones are in a loss state (S41). The determination method may include a misplacement determination method such as a method for monitoring the movement of the self-device using an acceleration sensor, a method for holding the history of an operation on the self-device and monitoring a user operation, or the like. When the holder of the mobile phone terminal 1 has lost the earphones, the loss determination unit 34 notifies the transmission state controller 35 of a transmission halt request (S42).

The transmission state controller 35 which has received the transmission halt request performs, on the short distance wireless communication unit 32, setting process for halting the regular transmission of a wireless signal from the self-device (S43). In order to perform transmission process at the time of a response corresponding to search (S44), the short distance wireless communication unit 32 may reduce power consumption in the whole earphones, compared with a case in which the wireless signal for detecting the mobile phone terminal 1 is regularly transmitted.

When having received a search request (S45), the short distance wireless communication unit 32 in the earphones notifies the transmission state controller 35 of the MAC address of the transmission source information, included in the search request (S46). The transmission state controller 35 compares the notified MAC address with the MAC address of the mobile phone terminal 1, stored in the storage unit 33. In addition, when the notified MAC address matches the MAC address of the mobile phone terminal 1, the transmission state controller 35 performs, on the short distance wireless communication unit 32, setting process for resuming the regular transmission of the wireless signal (S47).

Since the external device 2*a* such as the earphones or the like, lost by the holder of the mobile phone terminal 1, autonomously implements low power consumption, battery power consumption in the external device itself may be reduced. The run time of the external device 2*a* is lengthened, and running out of a battery may be reduced. The external device 2*a* autonomously resumes the regular transmission of the wireless signal based on the search request from the mobile phone terminal 1.

In S8 illustrated in FIG. 6A, the external device loss registration unit 26 transmits, to the subscriber information management device 3, an external device loss notice including the specific information of the lost earphones, the location information of the self-terminal, and the like through the mobile communication network communication unit 12. In place of the location information of the self-terminal, a communication log serving as the trajectory of the self-terminal may be included in the external device loss notice.

Figure 17:
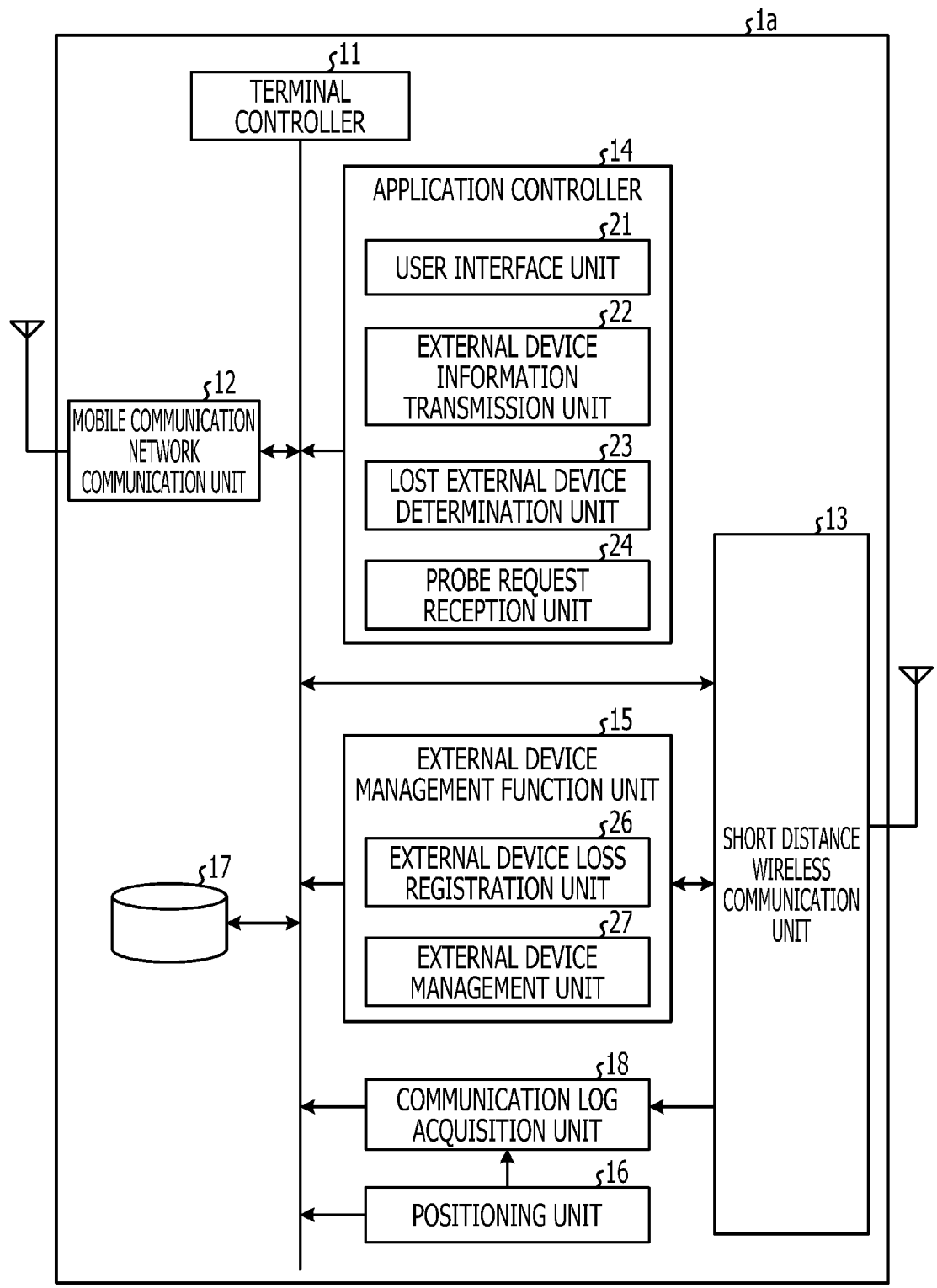
FIG. 17 illustrates an exemplary mobile phone terminal.

FIG. 17 illustrates an exemplary mobile phone terminal. A mobile phone terminal 1*a* illustrated in FIG. 17 may be the mobile phone terminal 1 illustrated in FIG. 1. In addition to the elements of the mobile phone terminal illustrated in FIG. 2, the mobile phone terminal 1*a* may include a communication log acquisition unit 18. The communication log acquisition unit 18 acquires and stores the information of the trajectory of the self-terminal in the storage unit 17 as the communication log. In FIG. 15, a same symbol is assigned to an element that is substantially the same as or similar to the element illustrated in FIG. 5, and the description thereof may be omitted or reduced. Each functional unit in the mobile phone terminal 1*a* may include a CPU, an FPGA, a memory, or the like, for example.

Figure 18:
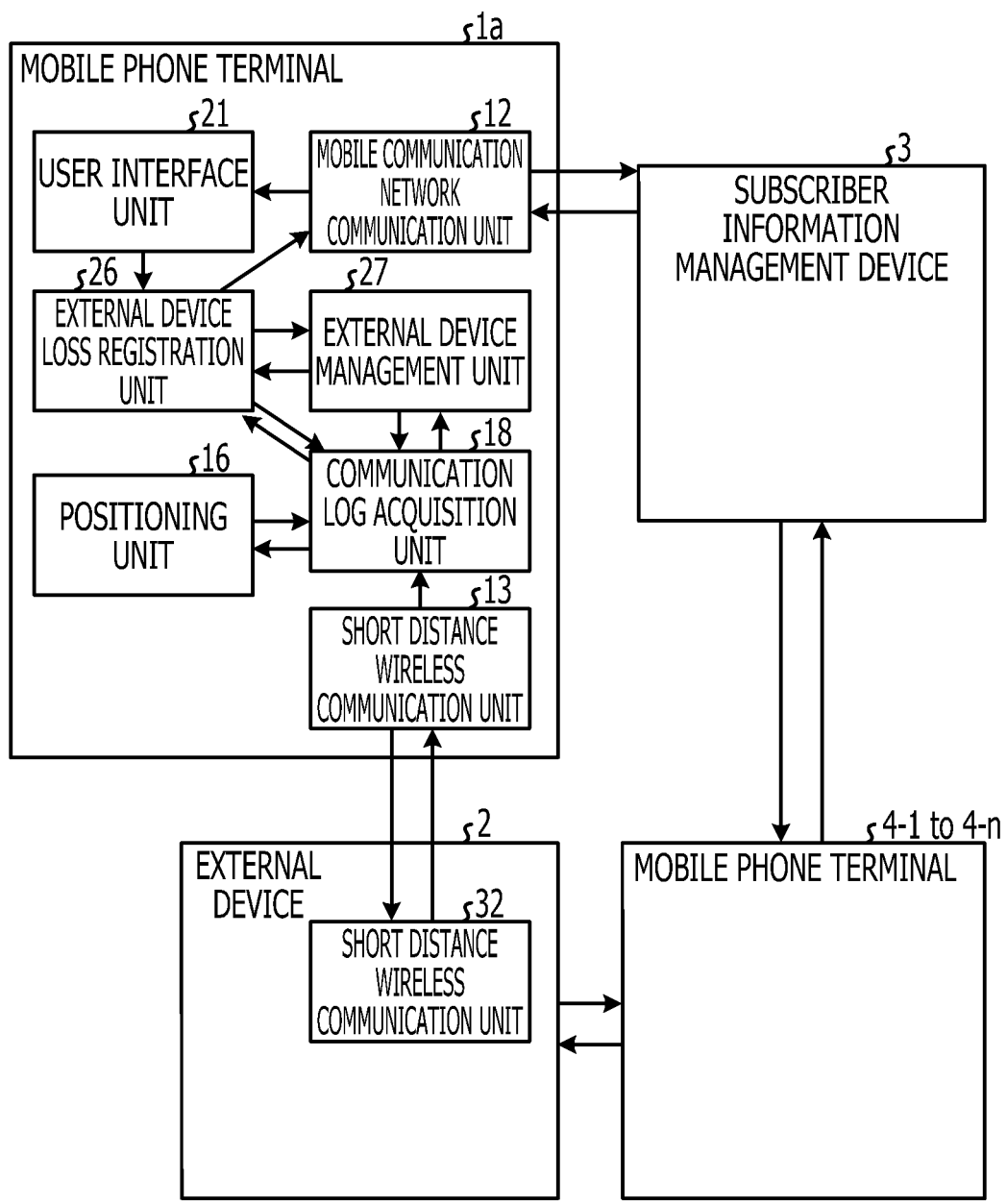
FIG. 18 illustrates an exemplary wireless communication system.
Figures 19, 19A, 19B:
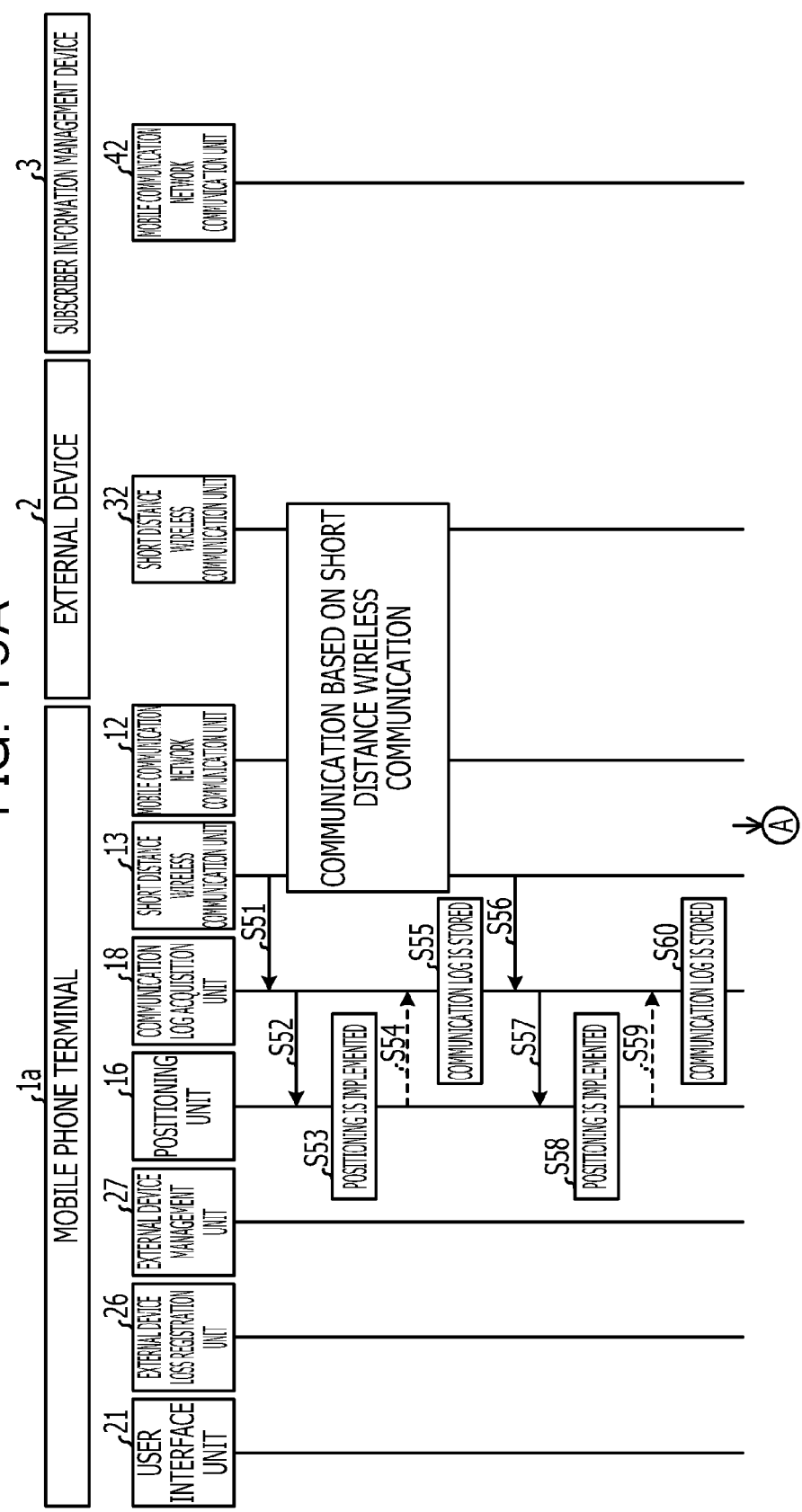
FIG. 19, which includes FIG. 19A
FIG. 19B illustrates an exemplary operation of a wireless communication system.

FIG. 18 illustrates an exemplary wireless communication system. The configurations of mobile phone terminals 4-1 to 4-*n* illustrated in FIG. 18 may be substantially the same as or similar to the configurations of the mobile phone terminals 4-1 to 4-*n* illustrated in FIG. 2 or FIG. 17. FIG. 19 illustrates an example of the operation of the wireless communication system. The wireless communication system illustrated in FIG. 18 may execute the operation illustrated in FIG. 19.

For example, when establishing short distance wireless communication with the short distance wireless communication unit 32 in the external device 2, the short distance wireless communication unit 13 in the mobile phone terminal 1*a* notifies the communication log acquisition unit 18 of a communication start (S51). The communication log acquisition unit 18 notified of the communication start notifies the positioning unit 16 of a location information acquisition request (S52). The positioning unit 16 measures the current location information of the self-terminal (S53), and notifies the communication log acquisition unit 18 of a measurement result (S54). The communication log acquisition unit 18 stores, as the communication log, the obtained location information at the time of the communication start in the storage unit 17 (S55).

For example, when the short distance wireless communication with the short distance wireless communication unit 32 in the external device 2 has been terminated, the short distance wireless communication unit 13 in the mobile phone terminal 1*a* notifies the communication log acquisition unit 18 of a communication end (S56). The communication end may include a communication end due to the power shortage of a battery. The communication log acquisition unit 18, which is notified of the communication end, notifies the positioning unit 16 of a location information acquisition request (S57). The positioning unit 16 measures the current location information of the self-terminal (S58), and notifies the communication log acquisition unit 18 of a measurement result (S59). The communication log acquisition unit 18 stores, as the communication log, the obtained location information at the time of the communication end in the storage unit 17 (S60).

The communication log acquisition unit 18 regularly or randomly notifies the positioning unit 16 of the location information acquisition request (S61). For example, at a timing at which a cell is changed owing to handover, the communication log acquisition unit 18 notifies the positioning unit 16 of the location information acquisition request. The positioning unit 16 measures the current location information of the self-terminal (S62), and notifies the communication log acquisition unit 18 of a measurement result (S63). The communication log acquisition unit 18 stores, as the communication log, location information at a handover destination in the storage unit 17 (S64).

The start, the end, and the handover of the short distance wireless communication trigger the measurement of the location information of the self-terminal to be continued, and the trajectory of the self-terminal is stored in the storage unit 17 as the communication log. FIG. 20 illustrates an exemplary communication log. The communication log may be stored in a state in which a log type, device information (MAC address and the like), and location information (a latitude, a longitude, and cell information) are associated with one another in units of measurement times. For example, in FIG. 20, a communication start, a communication end, or handover may trigger the measurement of the location information. At least one of the communication start, the communication end, and the handover may trigger the measurement of the location information.

When the earphones that is one of the external devices 2 has been lost, the mobile phone terminal 1*a* searches within the external device management table, reads the specific information of the lost earphones, and sets the loss flag to ON (S1, S2, and S3). The external device management unit 27 notifies the external device loss registration unit 26 of the specific information of the lost earphones (S65).

The external device loss registration unit 26 requests the communication log acquisition unit 18 to transmit the stored communication log (S66). The communication log acquisition unit 18 reads the communication log from the storage unit 17, and transmits the communication log to the external device loss registration unit 26 (S67). The communication log acquisition unit 18 halts the acquisition of the communication log until a next communication using the short distance wireless communication starts.

Through the mobile communication network communication unit 12 and the mobile communication network, the external device loss registration unit 26 transmits, to the subscriber information management device 3, an external device loss notice including the specific information of the lost earphones, the communication log, the information of a person having lost the earphones, and the like (S8). For example, the external device loss notice may be transmitted using an electronic mail.

The lost earphones may be searched in substantially the same way as or a way similar to the process illustrated in FIG. 6A and FIG. 6B. In S12, the lost external device information annunciation unit 44 in the subscriber information management device 3 may identify a search target cell based on the communication log.

The external device loss registration unit 26 transmits, to the subscriber information management device 3, an external device loss notice including the communication log serving as the trajectory of the mobile phone terminal 1*a*. Since the subscriber information management device 3 selects a plurality of search target cells, search is widely performed. Therefore, the probability of discovery of the lost external device may be improved.

The communication log acquisition unit 18 may also be added to the mobile phone terminal 1 illustrated in FIG. 2, and the communication log acquisition unit 18 may also be applied to the mobile phone terminal 1 illustrated in FIG. 15.

Figure 21:
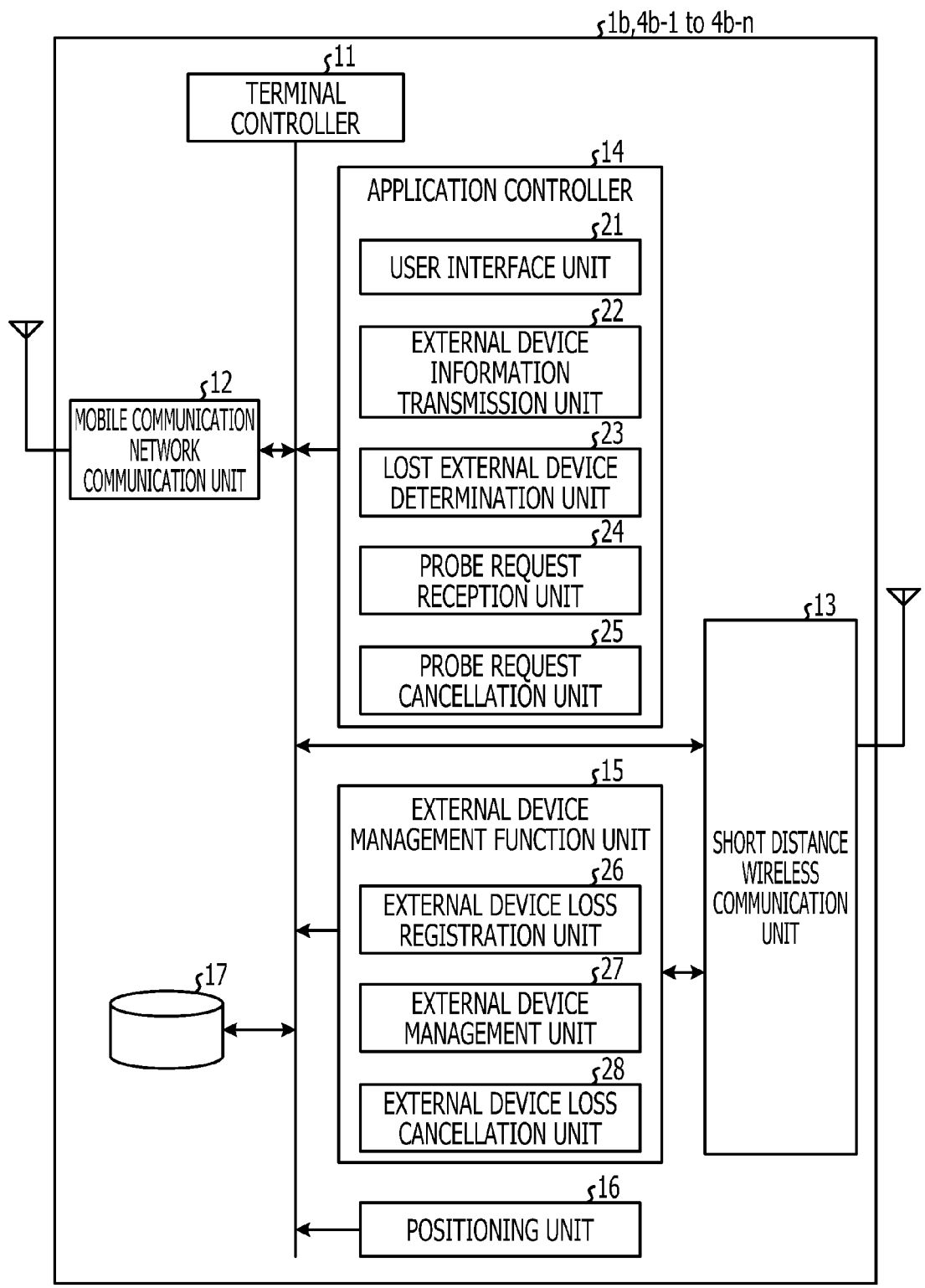
FIG. 21 illustrates an exemplary mobile phone terminal.

FIG. 21 illustrates an exemplary mobile phone terminal. Each of mobile phone terminals 1*b* and 4*b*-1 to 4*b*-*n* illustrated in FIG. 21 includes an external device loss cancellation unit 28 and a search request cancellation unit 25. Each of the mobile phone terminals 1*b* and 4*b*-1 to 4*b*-*n* illustrated in FIG. 21 may be the mobile phone terminal illustrated in FIG. 2. When the self-terminal has discovered the lost external device, the external device loss cancellation unit 28 cancels the loss registration information registered in the subscriber information management device. When having received a search request cancellation notice from the subscriber information management device, the search request cancellation unit 25 terminates the probing the external device. In FIG. 21, a same symbol is assigned to an element that is substantially the same as or similar to the element illustrated in FIG. 2, and the description thereof may be omitted or reduced. Each functional unit in the mobile phone terminal may include a CPU, an FPGA, a memory, or the like, for example.

Figure 22:
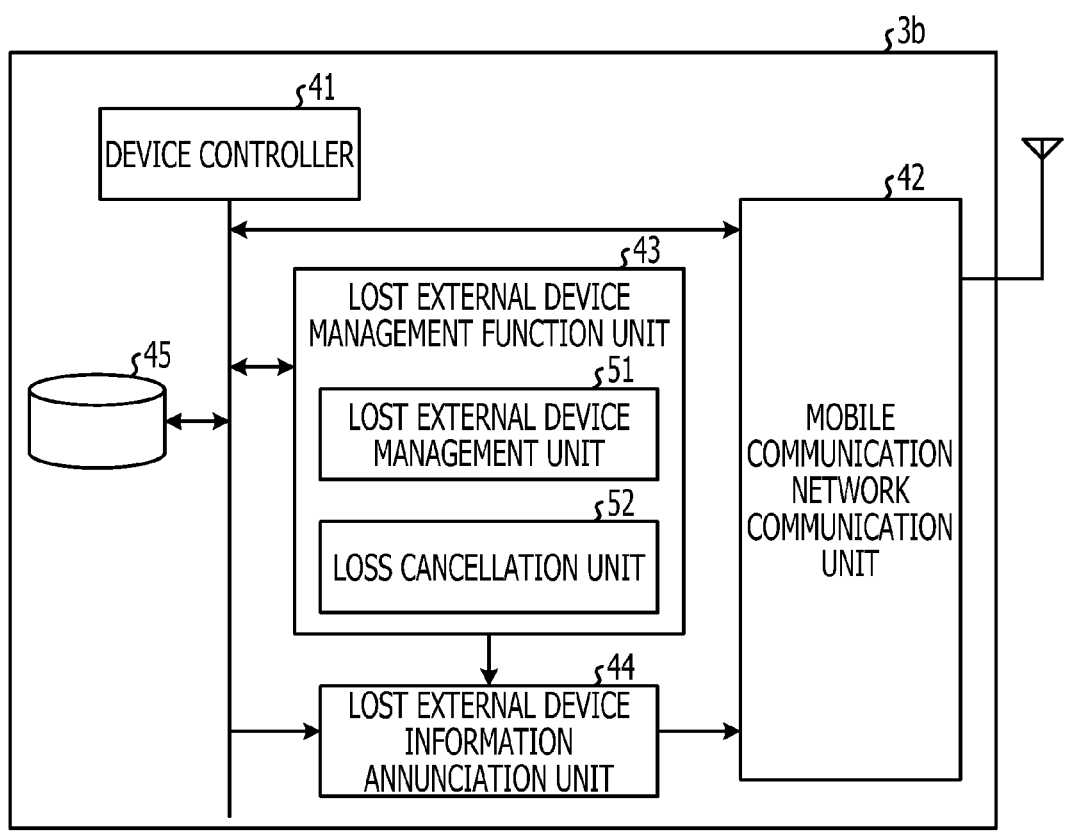
FIG. 22 illustrates an exemplary subscriber information management device.

FIG. 22 illustrates an exemplary subscriber information management device. The subscriber information management device 3*b* may include a loss cancellation unit 52. Other elements illustrated in FIG. 4 may be substantially the same as or similar to the elements illustrated in FIG. 5. The loss cancellation unit 52 searches the specific information of the external device subjected to loss registration, based on a loss deregistration notice from the mobile phone terminal 1*b*, and cancels the loss registration information relating to the external device. In FIG. 22, a same symbol is assigned to an element that is substantially the same as or similar to the element illustrated in FIG. 4, and the description thereof may be omitted or reduced. Each functional unit in the subscriber information management device 3*b* may include a CPU, an FPGA, a memory, or the like, for example.

Figure 23:
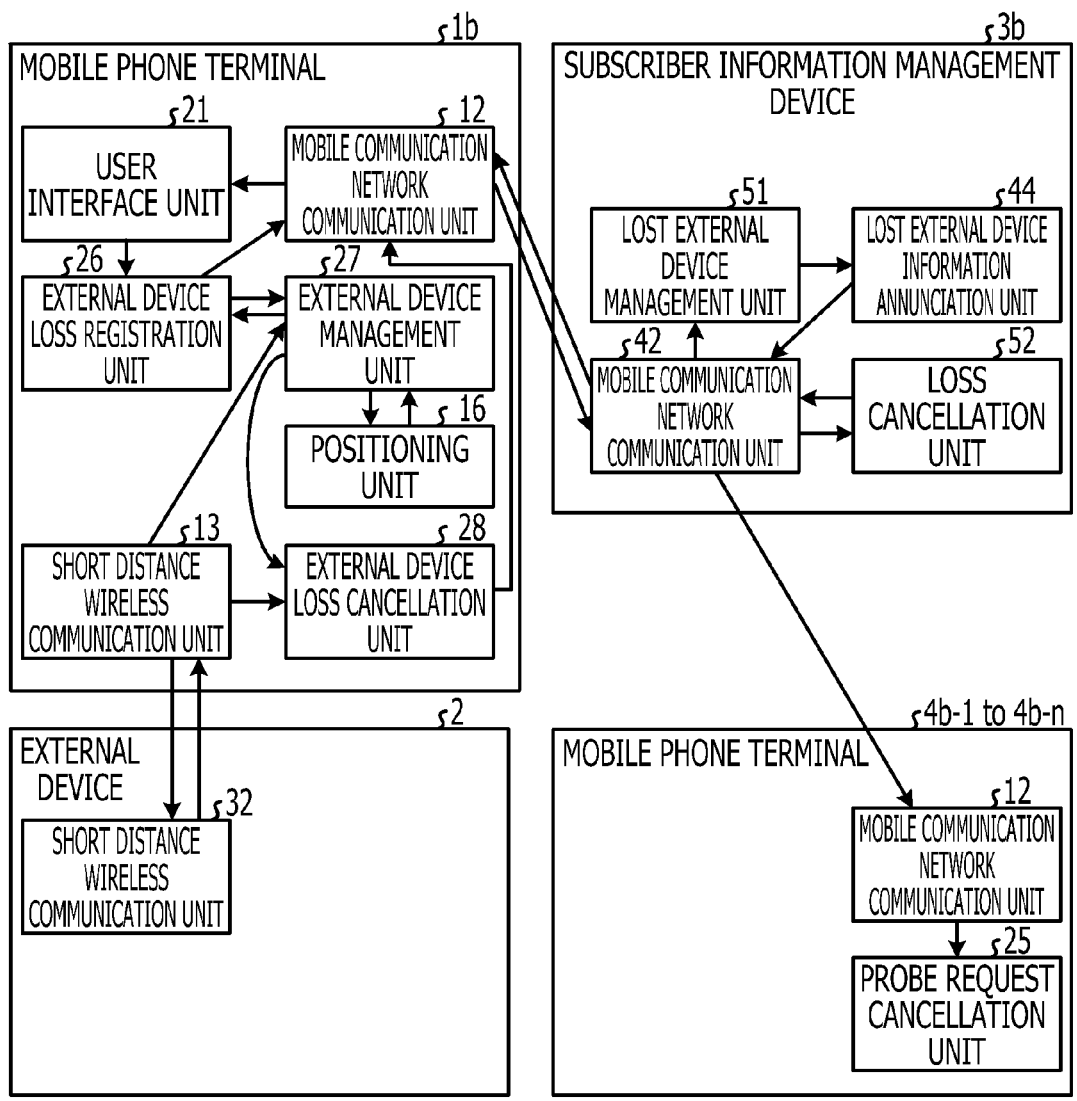
FIG. 23 illustrates an exemplary wireless communication system.
Figure 24:
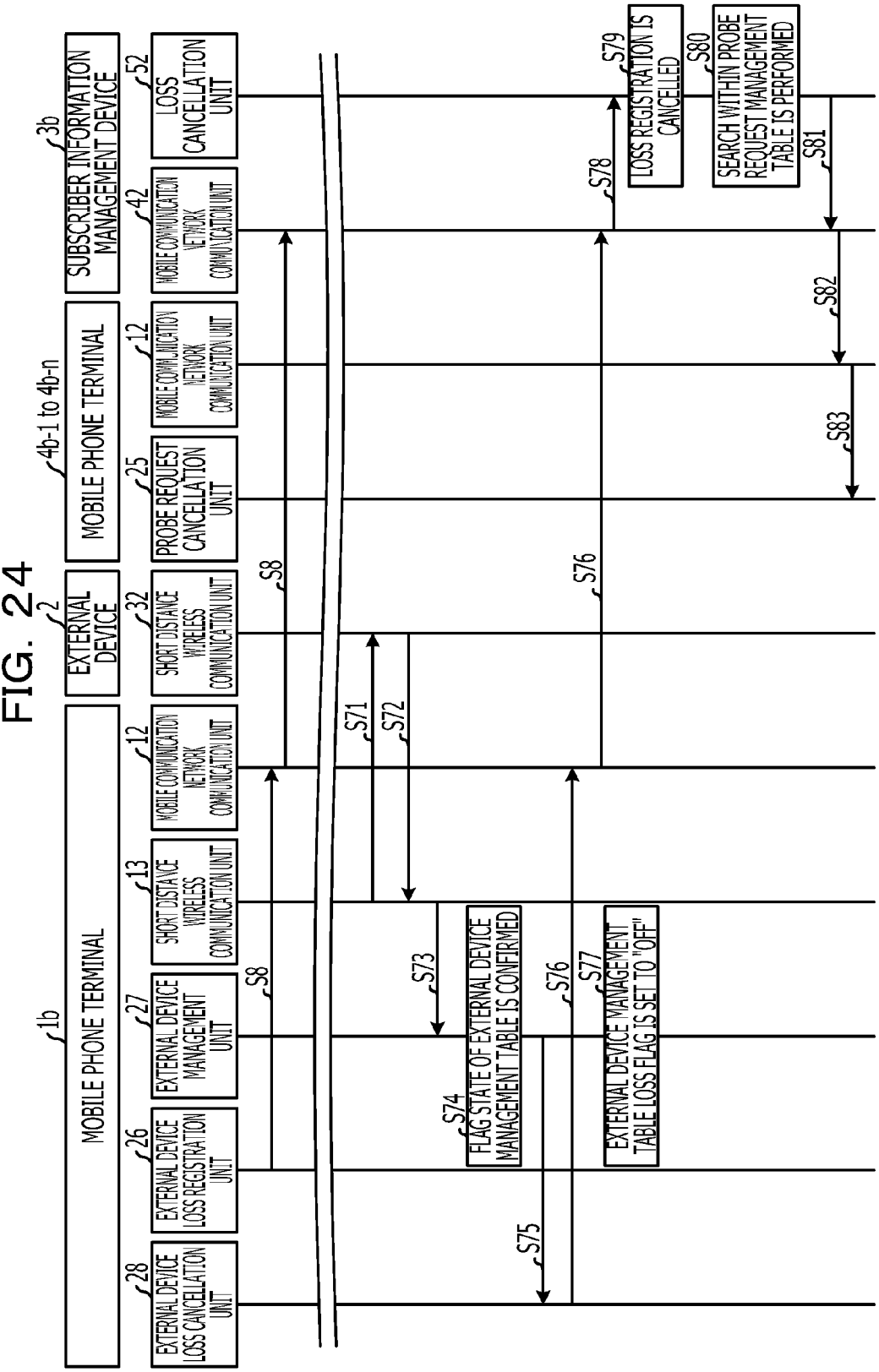
FIG. 24 illustrates an exemplary operation of a wireless communication system.

FIG. 23 illustrates an exemplary wireless communication system. The wireless communication system illustrated in FIG. 23 may include mobile phone terminals 1*b* and 4*b*-1 to 4*b*-*n* and a subscriber information management device 3*b*. Other elements illustrated in FIG. 23 may be substantially the same as or similar to the elements illustrated in FIG. 5. FIG. 24 illustrates an exemplary operation of the wireless communication system. The wireless communication system illustrated in FIG. 23 may execute the operation illustrated in FIG. 24.

For example, in the mobile phone terminal 1*b*, the short distance wireless communication unit 13 may search the wireless device at an arbitrary timing (S71) after the external device loss registration unit 26 transmits an external device loss notice to the subscriber information management device 3*b* (S8). The lost earphones or another external device 2 (refer to FIG. 7) may also be searched, and a new wireless device may also be detected.

When a response has occurred from a wireless device based on search (S72), the short distance wireless communication unit 13 notifies the external device management unit 27 of the information of the detected wireless device (S73). The external device management unit 27 refers to the external device management table within the storage unit 17, and determines whether or not the detected wireless device has a loss flag indicating "ON", for example, the lost earphones are included in the detected wireless device (S74). For example, when the lost earphones are included in the detected wireless device, the external device management unit 27 requests the external device loss cancellation unit 28 to cancel the loss registration (S75). After the request for the cancellation of the loss registration, the external device management unit 27 changes the loss flag of the earphones within the external device management table to "OFF" (S77).

The external device loss cancellation unit 28 requested to cancel the loss registration transmits, to the subscriber information management device 3b, a loss deregistration notice including the specific information of the earphones subjected to the loss registration, through the mobile communication network communication unit 12 and the mobile communication network (S76). For example, the loss deregistration notice may be transmitted using an electronic mail. FIG. 25 illustrates an exemplary loss deregistration notice. A predetermined message may be described in the body text of the loss deregistration notice.

The mobile communication network communication unit 42 in the subscriber information management device 3b notifies the loss cancellation unit 52 of the specific information of the earphones included in the loss deregistration notice (S78). The loss cancellation unit 52 searches, from the loss registration information within the storage unit 45, the specific information of the earphones subjected to the loss registration which matches the specific information given notice of, and the loss cancellation unit 52 cancels the registration (S79). The loss cancellation unit 52 searches within the search request management table in the storage unit 45 (refer to FIG. 9), and deletes information relating to the search request for the earphones (S80). The loss cancellation unit 52 requests the mobile communication network communication unit 42 to perform the search cancellation of the earphones (S81).

The mobile communication network communication unit 42 broadcasts a search request cancellation notice including the specific information of the earphones, to the mobile phone terminals 4b-1 to 4b-n within the search target cell (S82). For example, the search request cancellation notice may be transmitted using an electronic mail. FIG. 26 illustrates an exemplary search request cancellation notice. A predetermined message may be described in the body text of the search request cancellation notice.

The mobile communication network communication unit 12 in each of the mobile phone terminals 4b-1 to 4b-n notifies the search request cancellation unit 25 of the specific information of the earphones included in the search request cancellation notice (S83). For example, the search request cancellation unit 25 deletes the specific information of the earphones registered in the storage unit 17 by the lost external device determination unit 23 illustrated in FIG. 2, and implements the termination and deletion of the search application program.

When having found the missing external device 2, the mobile phone terminal 1b cancels the loss registration (process based on an external device loss notice) to the subscriber information management device 3b, and the search request of the subscriber information management device 3b is cancelled. Therefore, the search process for the external device 2 may be swiftly terminated.

While the external device loss cancellation unit 28 and the search request cancellation unit 25 are added to the mobile phone terminal illustrated in FIG. 5, and the loss cancellation unit 52 is added to the subscriber information management device illustrated in FIG. 5, the external device loss cancellation unit 28 and the search request cancellation unit 25 may be added to the mobile phone terminal illustrated in FIG. 15 or FIG. 18, and the loss cancellation unit 52 may be added to the subscriber information management device illustrated in FIG. 15 or FIG. 18.

Figure 27:
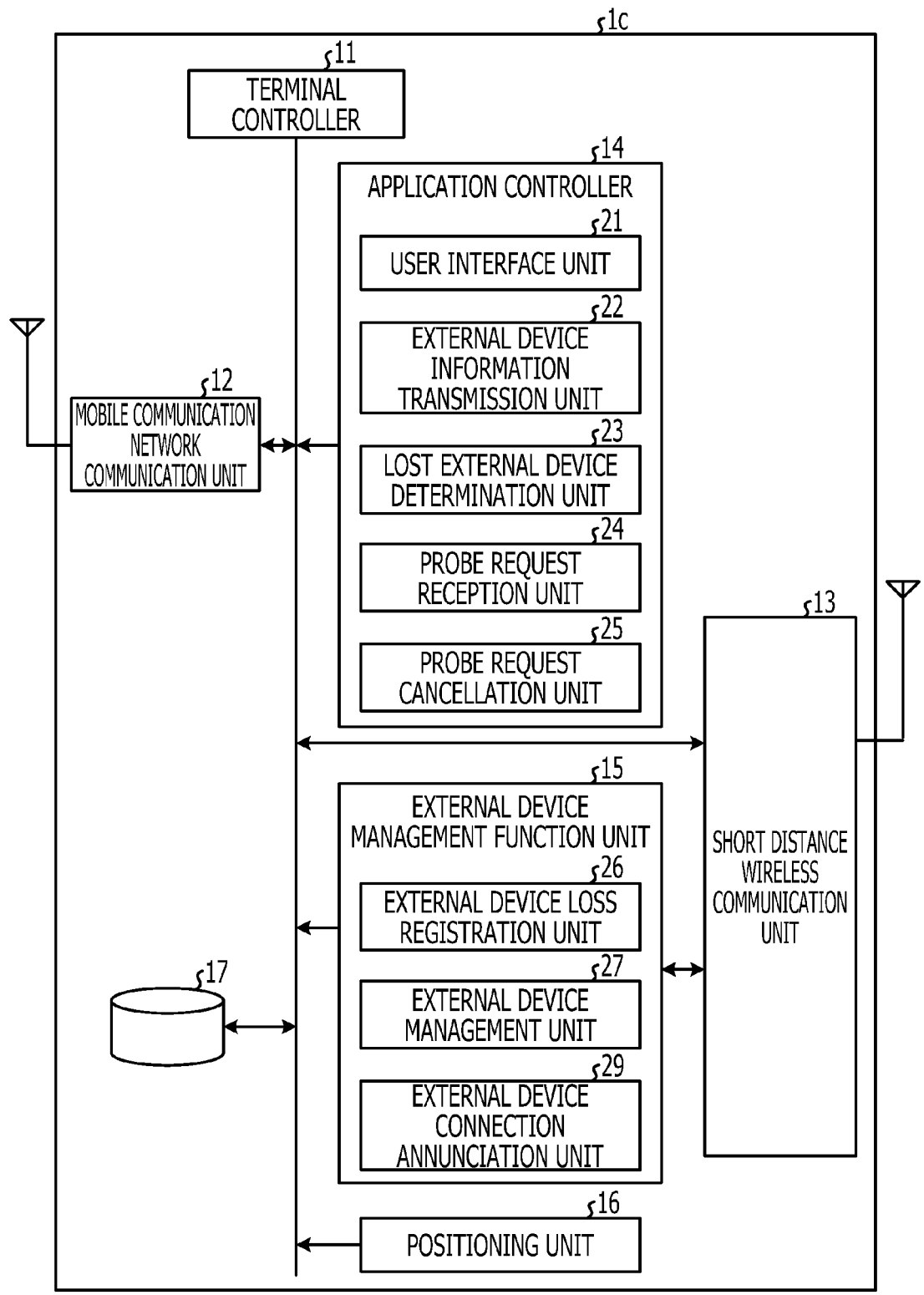
FIG. 27 illustrates an exemplary mobile phone terminal.

FIG. 27 illustrates an exemplary mobile phone terminal. Each of mobile phone terminals 1c and 4c-1 to 4c-n illustrated in FIG. 27 includes an external device connection annunciation unit 29 and the search request cancellation unit 25. The other configuration illustrated in FIG. 27 may be substantially the same as or similar to the configuration illustrated in FIG. 2. When the external device 2 is coupled using a wired line, the external device connection annunciation unit 29 provides for an external device connection notice to the subscriber information management device 3b. In FIG. 27, a same symbol is assigned to an element that is substantially the same as or similar to the element illustrated in FIG. 5, and the description thereof may be omitted or reduced. Each functional unit in the mobile phone terminal may include a CPU, an FPGA, a memory, or the like, for example.

Figure 28:
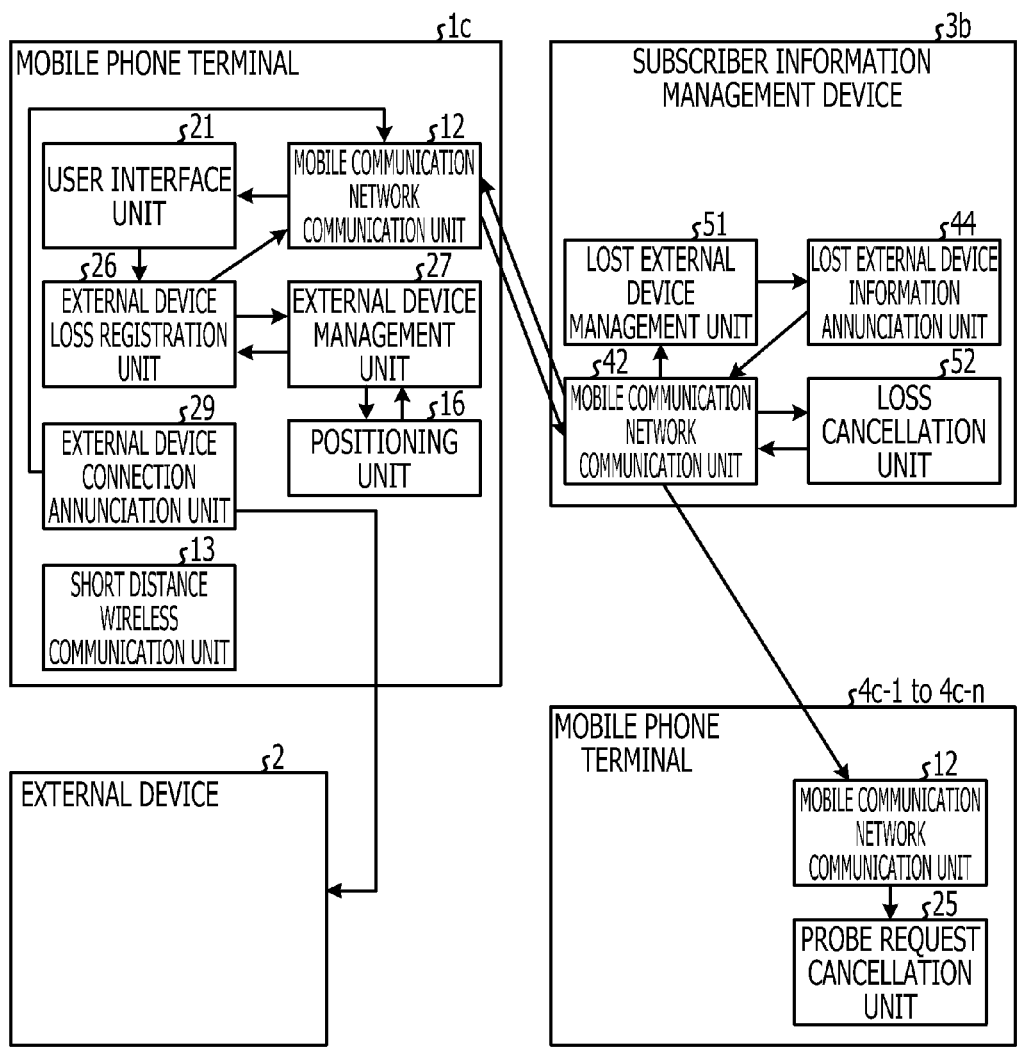
FIG. 28 illustrates an exemplary wireless communication system.
Figure 29:
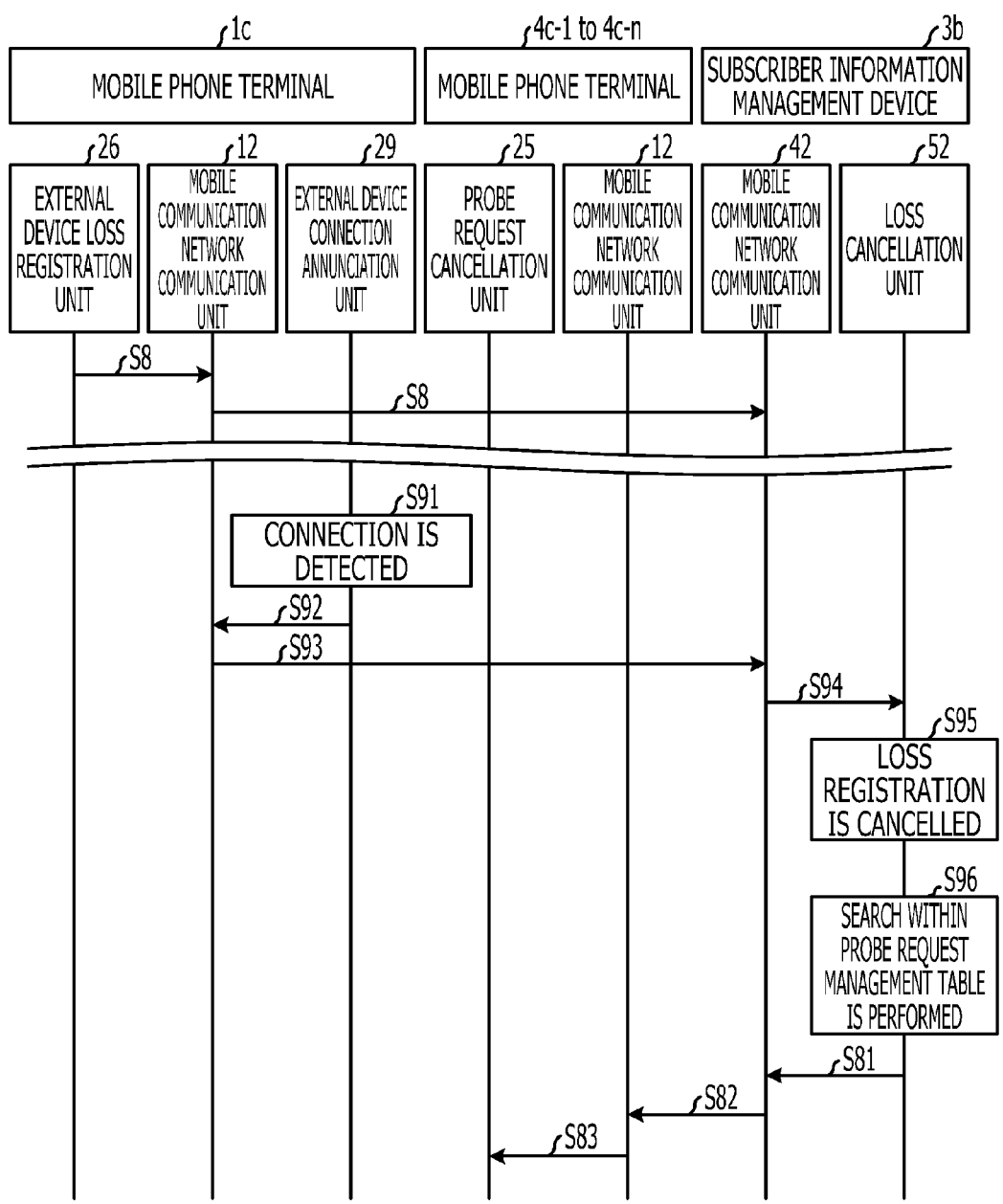
FIG. 29 illustrates an exemplary operation of a wireless communication system.

FIG. 28 illustrates an exemplary a wireless communication system. A wireless communication system illustrated in FIG. 28 includes the mobile phone terminals 1c and 4c-1 to 4c-n and the subscriber information management device 3b. Other elements illustrated in FIG. 28 may be substantially the same as or similar to the elements illustrated in FIG. 5. An external device 2 illustrated in FIG. 28 may be substantially the same as or similar to the external device illustrated in FIG. 5 or FIG. 18. FIG. 29 illustrates an exemplary operation of the wireless communication system. The wireless communication system illustrated in FIG. 28 may execute the operation illustrated in FIG. 29.

For example, the lost earphones may be wire-coupled to the mobile phone terminal 1c at an arbitrary timing (S91) after the external device loss registration unit 26 in the mobile phone terminal 1c transmits an external device loss notice to the subscriber information management device 3b (S8).

The external device connection annunciation unit 29 transmits, to the subscriber information management device 3b, an external device connection notice including the MAC address or the like of the earphones from the wired connection, through the mobile communication network communication unit 12 and the mobile communication network (S92 and S93). For example, the external device connection notice may be transmitted using an electronic mail. FIG. 30 illustrates an exemplary external device connection notice. A predetermined message may be described in the body text of the external device connection notice. The MAC address of the earphones, the phone number of the self-terminal, or the like may be attached as an attached file.

The mobile communication network communication unit 42 in the subscriber information management device 3b notifies the loss cancellation unit 52 of the MAC address of the earphones included in the external device connection notice (S94). The loss cancellation unit 52 searches, from the loss registration information within the storage unit 45, the specific information of the earphones subjected to the loss registration, which matches the noticed MAC address, and the loss cancellation unit 52 cancels the registration (S95). The loss cancellation unit 52 searches within the search request management table in the storage unit 45 (refer to FIG. 9), and deletes information relating to the search request for the earphones (S96). The same processing illustrated in FIG. 24 (S81 to S83) may be executed.

When the missing external device 2 has been wire-coupled to the mobile phone terminal 1c, the loss registration (process based on an external device loss notice) to the subscriber information management device 3b is cancelled, and the search request of the subscriber information management device 3b is cancelled. Therefore, process relating to the search of the external device may be swiftly terminated.

While the external device connection annunciation unit 29 and the search request cancellation unit 25 are added to the mobile phone terminal illustrated in FIG. 5, and the loss cancellation unit 52 is added to the subscriber information management device illustrated in FIG. 5, the external device connection annunciation unit 29 and the search request cancellation unit 25 may be added to the mobile phone terminal illustrated in FIG. 15, FIG. 18, or FIG. 23, and the loss cancellation unit 52 may be added to the subscriber information management device illustrated in FIG. 15, FIG. 18, or FIG. 23.

FIG. 31 illustrates an exemplary operation of a wireless communication system. For example, an unregistered wireless device may be coupled, as the external device 2, to the mobile phone terminal 4c-1 at an arbitrary timing (S101) after the external device loss registration unit 26 in the mobile phone terminal 1c has transmitted an external device loss notice to the subscriber information management device 3b (S8). The external device connection annunciation unit 29 notifies the positioning unit 16 of a location information acquisition request (S102). The positioning unit 16 measures the current location information of the self-terminal (S103), and notifies the external device connection annunciation unit 29 of a measurement result (S104). The external device connection annunciation unit 29 transmits, to the subscriber information management device 3b, a connection notice including the MAC address of the wireless device from the wired connection and the location information of the self-terminal, through the mobile communication network communication unit 12 and the mobile communication network (S105 and S106).

The mobile communication network communication unit 42 in the subscriber information management device 3b notifies the lost external device management unit 51 of the MAC address of the wireless device included in the connection notice (S107). The lost external device management unit 51 compares the notified MAC address with the specific information of the external device, the loss of which has been registered in the storage unit 45, and searches whether an external device matches the specific information (S108). For example, when the notified MAC address matches the MAC address of the earphones subjected to loss registration, the lost external device management unit 51 notifies the lost external device information annunciation unit 44 of the location information of the mobile phone terminal 4c-1 included in the connection notice, as the location information of the earphones (S109).

The lost external device information annunciation unit 44 transmits, to the mobile phone terminal 1c, a discovery notice including the location information of the earphones, through the mobile communication network communication unit 42 and the mobile communication network (S32 and S33).

When a wireless device that has not been registered as an external device has been coupled to the mobile phone terminal, a mobile phone terminal in which the wireless device is registered as the external device is notified of the location information of the wireless device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a first wireless communication terminal to register an external device,
   wherein a subscriber information management device transmits a location of the external device to the first wireless communication terminal based on a search result of the external device based on a search request for the external device, the search request being transmitted from the subscriber information management device to a second wireless communication terminal within a search target area, the second wireless communication terminal being identified by the subscriber information management device based on registration information including certain information and location information of the external device.

2. A wireless communication system according to claim 1, wherein
   the subscriber information management device manages subscriber information of a plurality of wireless communication terminals including the first wireless communication terminal and the second wireless communication terminal.

3. The wireless communication system according to claim 1, wherein
   the second wireless communication terminal detects a wireless device having information corresponding to the certain information and transmits a detection notice including location information of the second wireless communication terminal.

4. The wireless communication system according to claim 1, wherein
   when the subscriber information management device receives search results from a plurality of wireless communication terminals including the second wireless communication terminals and identifies a location where wireless communication ranges of the plurality of wireless communication terminals overlap with one another as the location of the external device.

5. The wireless communication system according to claim 1, wherein
   the external device halts transmission of a wireless signal by wireless communication other than a response corresponding to the search when detecting a loss state.

6. The wireless communication system according to claim 5, wherein
   the external device resumes the transmission of a wireless signal when receiving a search request from the first wireless communication terminal.

7. The wireless communication system according to claim 1, wherein
   when the first wireless communication terminal transmits the registration information including a trajectory of the first wireless communication terminal to the subscriber information management device.

8. The wireless communication system according to claim 1, wherein
   the first wireless communication terminal transmits a deregistration notice for terminating a search when detecting the external device based on the search after the registration information being transmitted.

9. The wireless communication system according to claim 8, wherein the subscriber information management device transmits a search request cancellation notice for terminating the search to the second wireless communication terminal based on the deregistration notice.

10. The wireless communication system according to claim 1, wherein
the first wireless communication terminal transmits a connection notice for terminating the search to the subscriber information management device when the external device being wire-connected after a transmission of the registration information.

11. The wireless communication system according to claim 10, wherein
the subscriber information management device transmits a search request cancellation notice for terminating the search to the second wireless communication terminal based on the connection notice.

12. The wireless communication system according to claim 1, wherein
a third wireless communication terminal to which an unregistered wireless device is wire-connected transmits an unregistered connection notice including location information and specific information of the wireless device to subscriber information management device after a transmission of the registration information, and
the subscriber information management device identifies a location of the external device based on the location information of the third wireless communication terminal when the information of the wireless device and the information of the external device coincide with each other and transmits a search notice to the first wireless communication terminal.

13. A wireless communication terminal, comprising:
a registration unit configured to transmit registration information including location information and certain information of a registerable external device to a subscriber information management device; and
a search unit configured to search a wireless device based on a search request for the external device from the subscriber information management device and transmit a search notice including the location information to the subscriber information management device when detecting a wireless device corresponding to the certain information of the external device.

14. The wireless communication terminal according to claim 13, wherein
the registration unit transmits the registration information including a trajectory to the subscriber information management device.

15. A subscriber information management device, comprising
a first transmission unit configured to identify a search target area where an external device is to be searched based on location information when receiving registration information including certain information and location information of the external device from a first wireless communication terminal registering the external device, and transmit a search request including the certain information of the external device to a second wireless communication terminal within the search target area; and
a second transmission unit configured to identify a location of the external device based on location information included in a search notice when receiving the search notice including location information of the second wireless communication terminal from the second wireless communication terminal, and transmit a discovery notice including the location of the external device, to the first wireless communication terminal.

* * * * *